US011866866B2

(12) United States Patent
Rensing et al.

(10) Patent No.: US 11,866,866 B2
(45) Date of Patent: Jan. 9, 2024

(54) AUTONOMOUS LAUNDRY WASHING AND DRYING SYSTEMS AND METHODS

(71) Applicant: Monotony.ai, Inc., Newton, MA (US)

(72) Inventors: Noa M. Rensing, West Newton, MA (US); Benjamin D. Bixby, Newton Highlands, MA (US); Jesse Sielaff, Norfolk, MA (US)

(73) Assignee: Monotony.ai, Inc., Watertown, MA (US)

( * ) Notice: Subject to any disclaimer, the term of this patent is extended or adjusted under 35 U.S.C. 154(b) by 185 days.

(21) Appl. No.: 17/331,220

(22) Filed: May 26, 2021

(65) Prior Publication Data

US 2021/0372036 A1 Dec. 2, 2021

Related U.S. Application Data

(60) Provisional application No. 63/086,041, filed on Sep. 30, 2020, provisional application No. 63/030,903, filed on May 27, 2020.

(51) Int. Cl.
*D06F 31/00* (2006.01)
*D06F 29/00* (2006.01)
(Continued)

(52) U.S. Cl.
CPC ............ *D06F 31/00* (2013.01); *D06F 29/005* (2013.01); *D06F 33/72* (2020.02); *D06F 58/48* (2020.02);
(Continued)

(58) Field of Classification Search
CPC ........ D06F 29/005; D06F 95/00; D06F 31/00; D06F 58/48; D06F 33/72; H02J 2310/14
See application file for complete search history.

(56) References Cited

U.S. PATENT DOCUMENTS 3,050,867 A   8/1962 Friedman
4,036,365 A * 7/1977 Rosenfeld ............ B07C 5/3412
                                                    209/3.3
(Continued)

FOREIGN PATENT DOCUMENTS

CN    103237937 A    8/2013
EP      3031974 A1   6/2016
(Continued)

OTHER PUBLICATIONS

Machine translation of JP-4858321-B2, dated Jan. 2012. (Year: 2012).*

(Continued)

*Primary Examiner* — Michael E Barr
*Assistant Examiner* — Kevin G Lee
(74) *Attorney, Agent, or Firm* — Myers Bigel, P.A.

(57) ABSTRACT

An energy efficient autonomous laundry system includes a plurality of combination washing and drying machines, at least one exhaust combining manifold in fluid communication with the plurality of combination washing and drying machines, at least one heat pump receiving combined exhaust from the manifold, one or more sensors disposed throughout the airflow of the system, and a controller in operative communication with all of these system components. The controller is configured to receive an output signal, analyze at least one air characteristic associated with the one or more sensors, determine, based on the analysis, whether the at least one air characteristics is within a preprogrammed range of values for at least one of air temperature, air flow, and air humidity, and adjust one or more controls, including controls for adjusting at least one of air temperature, air flow, and air humidity at the one or more locations within the system.

15 Claims, 16 Drawing Sheets

(51) Int. Cl.
| | |
|---|---|
| *D06F 58/48* | (2020.01) |
| *D06F 33/72* | (2020.01) |
| *D06F 95/00* | (2006.01) |
| *B25J 11/00* | (2006.01) |
| *D06F 34/08* | (2020.01) |
| *D06F 34/26* | (2020.01) |
| *D06F 39/04* | (2006.01) |
| *D06F 33/50* | (2020.01) |

(52) U.S. Cl.
CPC ........... *B25J 11/0085* (2013.01); *D06F 33/50* (2020.02); *D06F 34/08* (2020.02); *D06F 34/26* (2020.02); *D06F 39/04* (2013.01); *D06F 95/00* (2013.01)

(56) References Cited

U.S. PATENT DOCUMENTS

| | | | |
|---|---|---|---|
| 4,195,498 | A * | 4/1980 | Pellerin ................ H01H 43/121 68/210 |
| 4,509,345 | A | 4/1985 | Alio |
| 4,572,429 | A | 2/1986 | Huffman et al. |
| 4,885,853 | A | 12/1989 | McCabe |
| 6,324,771 | B1 | 12/2001 | McAllister et al. |
| 9,022,228 | B2 | 5/2015 | Grunert |
| 9,080,282 | B2 | 7/2015 | Zambrowicz et al. |
| 10,435,836 | B2 | 10/2019 | Lundt et al. |
| 2007/0251115 | A1 | 11/2007 | Bringewatt et al. |
| 2009/0157529 | A1* | 6/2009 | Ehlers ................... F24F 11/523 700/297 |
| 2009/0215375 | A1 | 8/2009 | Hagensen |
| 2012/0292008 | A1 | 11/2012 | Goldberg |
| 2015/0033779 | A1 | 2/2015 | Seggerman |
| 2022/0372685 | A1* | 11/2022 | Lee ......................... D06F 33/63 |
| 2023/0043093 | A1* | 2/2023 | Wu ......................... D06F 58/20 |

FOREIGN PATENT DOCUMENTS

| | | | |
|---|---|---|---|
| EP | 2267207 | B1 | 8/2016 |
| JP | 2009279700 | A | 12/2009 |
| JP | 4858321 | B2 * | 1/2012 |
| JP | 2019041969 | A | 3/2019 |
| WO | 2017153511 | A1 | 9/2017 |
| WO | 2019137585 | A1 | 7/2019 |

OTHER PUBLICATIONS

CloPeMa CERTH, Feb. 3, 2014—"Autonomous Active Recognition and Unfolding of Clothes using Random Decision Forests and Probabilistic Planning", downloaded from Youtube: https://www.youtube.com/watch?v=YpD-ip6g5IY.
CloPeMa Robot, Apr. 23, 2014, Complete Autonomous Folding of Shorts Starting from Random Configuration, downloaded from Youtube, https://www.youtube.com/watch?v=mrh4TJK1gdQ.
Jensen-Group, Jul. 13, 2010 "Innovation", retrieved from Youtube: https://www.youtube.com/watch?v=MZAilk2_vul.
Ambarita, H. , et al., "Performance and Characteristics of Heat Pump Clothes Drier", IOP Conf. Series: Materials Science and Engineering 180 (2017) 012027, 9 pages.
Le, Thuy-Hong-Loan , et al., "Application of a Biphasic Actuator in the Design of the CloPeMa Robot Gripper", Journal of Mechanisms and Robotics, Feb. 2015, vol. 7 / 011011-1, 9 pages.
Le, Thuy-Hong-Loan , et al., "On the Development of a Specialized Flexible Gripper for Garment Handling", Journal of Automation and Control Engineering vol. 1, No. 3, Sep. 2013, 5 pages.
Maitin-Shepard, Jeremy , et al., May 17, 2010 Cloth Grasp Point Detection based on Multiple-View Geometric Cues with Application to Robotic Towel Folding, retrieved from Youtube: https://www.youtube.com/watch?v=gy5g33S0Gzo.
Triantafyllou, Dimitra , et al., "Visual Feature Extraction and Topological Analysis for Inferring the Configuration of Hanging Cloth", https://www.iti.gr/iti/files/document/publications/02_ICCVIP2013.pdf, 2013, 6 pages.

Zhang, Yanda , et al., Commercial Clothes Dryers, Codes and Standards Enhancement (CASE) Initiative For PY 2013: Title 20 Standards Development, Analysis of Standards Proposal for Commercial Clothes Dryers, California Energy Commission, Jul. 2013, 57 pages.
Aaon , "Value in the Air—Why Direct Drive Backward Curved Plenum Fans?", www.aaon.com/technical, available at the time of filing, 36 pages.
Amaris, Carlos , et al., "Analysis of an R744 typical booster configuration, an R744 parallel-compressor booster configuration and an R717/R744 cascade-refrigeration system for retail food applications. Part 1 Thermodynamic analysis", ScienceDirect, Energy Procedia 161 (2019) 259-267.
Ambarita, Himsar , et al., "Performance of a clothes drying cabinet by utilizing waste heat from a split-type residential air conditioner", Elsevier, Case Studies in Thermal Engineering, i (2019) 105-114.
Bansal, Pradeep , et al., "A novel design of a household clothes tumbler dryer", Elsevier, Applied Thermal Engineering 30 (2010) 277-285.
Bendt, Paul , "Are We Missing Energy Savings in Clothes Dryers", ACEEE Summer Study on Energy Efficiency in Buildings, 2010, 14 pages.
Bouteiller, Paul , et al., "Experimental Study of Heat Pump Thermodynamic Cycles Using CO2 Based Mixtures—Methodology and First Results".
Brown, Mark , "Simulations for thermodynamic analyses of transcritical carbon dioxide refrigeration cycle and reheat dehumidification air conditioning cycle", Graduate Thesis and Dissertations, University of South Florida Scholar Commons, May 5, 2006, 231 pages.
Brunzell, Lena , "Energy Efficient Textile Drying", Karlstads Universitet, Faculty of Technology and Science Environmental and Energy Systems (2006) 48 pages.
Buisson, Y.L. , et al., "Qualitative and Quantitative Evaluation of Cotton Fabric Damage by Tumble Drying", Textile Res. J. 70(8), (2000), 739-743.
Cavallini, Alberto , et al., "Carbon dioxide as a natural refrigerant", International Journal of Low Carbon Technologies 2/3, Jul. 2007, 225-249.
Gluesenkamp, Kyle R., et al., "An Efficient Correlation for Heat and Mass Transfer Effectiveness in Tumble-type Clothes Dryer Drums", Elsevier, Energy, vol. 172, Apr. 1, 2019, 1225-1242.
Gluesenkamp, Kyle , "Residential Clothes Dryer Performance Under Timed and Automatic Cycle Termination Test Procedures", Oak Ridge National Laboratory, ORNL/TM-2014/431, Oct. 2014, 63 pages.
Gullo, Paride , et al., "State-of-the-art technologies for transcritical R744 refrigeration systems—a theoretical assessment of energy advantages for European food retail industry", Elsevier, ScienceDirect, Energy Procedia, 123 (2017) 46-53.
Honma, M. , et al., "Experimental Study on Compact Heat Pump System for Clothes Drying Using CO2 as a Refrigerant", 7th IIR Gustav Lorentzen Conference on Natural Working Fluids (2006) 8 pages.
Kim, Man-Hoe , et al., "Fundamental process and system design issues in CO2 vapor compression systems", Elsevier, ScienceDirect, Progress in Energy and Combustion Science 30 (2004) 119-174.
Lui, Yefeng , et al., "Energy-saving performance and economics of CO2 and NH3 heat pumps with simultaneous cooling and heating applications in food processing: Case studies", International Journal of Refrigeration, Sep. 2016, 27 pages.
Mancini, Ferdinando , et al., "Thermodynamic analysis and experimental investigation of a CO2 household heat pump dryer", International Journal of Refrigeration 34 (2011) 851-858).
Merediz, Alberto , "Modeling of Dehydration Processes in Controlled Spinning of Washing Machines", Department of Applied Mechanics, Division of Dynamics, Chalmers University of Technology, 2009 Master's Thesis 2009:33.
Minea, Vasile , "Industrial Drying Heat Pumps", Refrigeration: Theory, Technology and Applications (2011) 71 pages.
Neksa, P. , "CO2 As Refrigerant for Systems in Transcritical Operation Principles and Technology", SINTEF Energy Research, No. 7465, EcoLibrium (TM), Oct. 2004, 6 pages.

(56) References Cited

OTHER PUBLICATIONS

Pal, U.S., et al., "Calculation Steps for the Design of Different Components of Heat Pump Dryers Under Constant Drying Rate Condition", Drying Technology,26:7,(2008) 864-872.

Patel, Viral K., et al., "Experimental evaluation and thermodynamic system modeling of thermoelectric heat pump clothes dryer", Applied Energy, vol. 217, Feb. 28, 2018, 34 pages.

Pescatore, Peter, et al., "High Efficiency, High Performance Clothes Dryer", Final Report for the Department of Energy, TIAX, Mar. 31, 2005, 31 pages.

Rony, Rajib Uddin, et al., "Recent Advances in Transcritcal CO2 (R744) Heat Pump System: A Review", Energies, 2019, 12, 457, 35 pages.

Sahu, Anjan Kumar, et al., "A parametric study of transcritical CO2 simple cooling cycle and combined power cycle", International Journal of Low-Carbon Technologies 2017, 12, 383-391.

Strommen, Ingvald, et al., "Operational Modes for Heat Pump Drying—New Technologies ADN Production of a New Generation of High Quality Dried Fish Products", International congress of Refrigeration 2003, 8 pages.

Tegrotenhuis, W., et al., "Affordable Hybrid Heat Pump Clothes Dryer", Pacific Northwest National Laboratory, Jun. 2016, 78 pages.

Tegrotenhuis, W., "Clothes Dryer Automatic Termination Evaluation", Pacific Northwest National Laboratory, vol. 2: Improved Sensor and Control Designs, Sep. 2014, 46 pages.

Tegrotenhuis, W., "Clothes Dryer Automatic Termination Sensor Evaluation", Pacific Northwest National Laboratory, vol. 1: Characterization of Energy Use in Residential Clothes Dryers, Sep. 2014, 42 pages.

Wei, Y., et al., "Enhancing the energy efficiency of domestic dryer by drying process optimization", Drying Technology, 2017, 48 pages.

Yadav, V., et al., "Fabric-drying process in domestic dryers", Applied Energy 85 (2008) 143-158.

Bansal, et al., "Improving the energy efficiency of conventional tumbler clothes drying systems", International Journal of Energy Research, 25(15) (Abstract only), 2001, 1315-1332.

Bassily, et al., "Performance Analysis of an Electric Clothes Dryer", Drying Technology: An International Journal, 21 (3), 2003, 499-524.

Cavallini, Alberto, "Properties of CO2 as a Refrigerant", Galileo Study Center Industry & Training; University of Milan Research Center for the Environment and Business. European Seminar., 2004, (17 pages).

Gluesenkamp, et al., "An efficient correlation for heat and mass transfer effectiveness in tumble-type clothes dryer drums", Energy, 172, 2019, 1225-1242.

Liu, et al., "Energy-saving performance and economics of CO2 and NH3 heat pumps with simultaneous cooling and heating applications in food processing: Case studies", International Journal of Refrigeration, 73, 2017, 111-124.

Patel, et al., "Experimental evaluation and thermodynamic system modeling of thermoelectric heat pump clothes dryer", Applied Energy, 217, May 2018, 221-232.

Wei, et al., "Enhancing the Energy Efficiency of Domestic Dryer by Drying Process Optimization", Drying Technologies: An International Journal, 36(7), 2018, 790-803.

* cited by examiner

AUTONOMOUS LAUNDRY WASHING AND DRYING SYSTEMS AND METHODS

CROSS-REFERENCE TO RELATED APPLICATIONS

This application claims priority under 35 U.S.C. § 119(e) to U.S. Provisional Patent Application Ser. No. 63/030,903 filed May 27, 2020, titled "Autonomous Laundry Washing and Drying Systems and Methods," and U.S. Provisional Patent Application Ser. No. 63/086,041 filed Sep. 30, 2020, titled "Autonomous Laundry Washing and Drying Devices, Systems, And Methods of Use," the entirety of each of these applications is hereby incorporated by reference.

BACKGROUND

The present disclosure is directed to robotic laundry devices, systems, and methods.

Automating and outsourcing mundane, time-consuming household chores to robotic devices is increasingly common. Time saving home robots include, for example, floor vacuuming and floor washing robots. Outsourcing responsibilities include, for example, engaging grocery shopping and delivery services, and manually operated and human-operator dependent laundry washing and dry-cleaning pick up and return services.

Many homes are appointed with a dedicated washer and dryer for family use. Domestic washers and dryers are increasingly sophisticated and include IoT connectivity features and push notifications for alerting users about cycle progress and energy and resource usage. These technologically advanced machines, however, require human interaction and cannot eliminate the time required for processing loads of laundry in the home. Although more modern, "high efficiency" machines are equipped with sensors for metering water usage and dryer temperatures, the efficiency gains are capped by the constraints of sequentially processing single loads of laundry. Grey water is output to the city water and sewer system for mitigation with each load of laundry processed. Energy is consumed with each load of laundry washed and dried.

Households can outsource laundry chores to laundromat facilities for a fee in exchange for time. Laundromats offering residential mixed load laundering services, however, require human interaction for intake and sorting of dirty laundry, transferring loads from washer to dryer, and then manually folding clean laundry. These are costly processes as measured in time, energy consumption, water consumption, and wastewater output, and they rely on human intervention to keep the process running at every transition and throughout several process steps. This invites delays at every stage. Because these processes are human-dependent and inefficient, the costs are passed along to customers outsourcing their laundry for cleaning. Human-reliant laundering services also require that employees touch the belongings of the customer, potentially exposing the employee to contaminants in the dirty laundry and potentially exposing the clean laundry to transferable pathogens, dust, hair, and other debris emanating from a laundromat employee. In addition to potentially introducing undesirable contact contamination from the employees processing the loads of laundry, a privacy barrier is breached. Outsourcing household laundry to a laundromat involves employees interacting with customers' personal belongings including bodily worn garments.

Industrial laundry services exist for handling uniform business-related items, such as hospital bed sheets, medical scrubs, and hotel sheets and towels. Such industrial machines are tailor-made to accept one type of laundry item of one size or style. For example, unique folding machines exist to accept washed flat sheets, fitted sheets, hotel towels, and hotel bathrobes. These machines require human operators to load the washed article into its dedicated machine, which is sized and designed to fold that one type and size of article. This type of process line relies on a human operator for properly aligning and loading the clean article into the machine, which could introduce bodily contaminants, bacteria, and viral matter into the clean articles. Like laundromat services, these industrial services rely on human intervention and potentially introduce bio-contaminants into clean loads of laundry. Because these services are only profitable by processing large volumes of like items, these industrial processors are generally subscription-based services for large clients like hotels and hospitals producing standard-size, repeat laundry articles and are not available to consumers at an individual household level. Additionally, these services are configured to combine laundry from more than one source and are not configured to isolate and process separate loads for individual households.

Autonomous robotic devices are provided to process loads of household laundry. Such devices eliminate human contact with deformable laundry articles. As such, the devices need to be designed to be efficient and reliable for replacing the common, human-dependent chore of laundry.

SUMMARY

In one example, an energy efficient autonomous laundry system, includes a plurality of autonomous washing and drying machines configured to wash and dry a plurality of loads of laundry, each one of the plurality of autonomous washing and drying machines comprising at least one motor drive configured to rotate a spinning drum and at least one heater drive, wherein the spinning drum is configured to receive therein and sequentially wash and dry a load of laundry. The system includes an exhaust manifold configured to receive and combine exhausted humid air from two or more of the plurality of autonomous washing and drying machines and output the combined exhausted humid air, the manifold comprising at least one moveable valve for routing the combined exhausted humid air. The system includes at least one heat pump configured to receive the combined exhausted humid air, the at least one heat pump configured to cool the exhausted humid air below a dew point to condense moisture from the exhausted humid air, creating dehumidified air, heat the dehumidified air for delivery into a conduit in fluid communication with the plurality of autonomous washing and drying machines, and drain the condensed moisture. The system includes one or more air sensors configured to measure at least one air characteristic at one or more locations of the system, and output a signal indicative of the at least one air characteristic. The system includes a controller in operative communication with the at least one motor drive and at least one heater drive of each one of the plurality of autonomous washing and drying machines, a valve actuator of the exhaust manifold, at least one drive of the heat pump and the one or more air sensors. The controller is configured to receive the output signal of the one or more air sensors, analyze the at least one air characteristic associated with the one or more air sensors, determine, based on the analysis, whether the at least one air characteristics is within a preprogrammed range of values for at least one of air temperature, air flow, and air humidity, and adjust, in response to determining at least one air characteristic is not within a preprogrammed range of values, one or more controls for at least one of air temperature, air flow, and air humidity at the one or more locations of the system. Adjusting the one or more controls includes selectively routing a heated portion of dehumidified air from the heat pump to one or more of the plurality of autonomous washing and drying machines.

Implementations of the system may include one or more of the following features.

In examples, the plurality of autonomous washing and drying machines include between about 6 and 12 washing and drying machines.

In examples, the preprogrammed range of values includes a relative humidity of dehumidified air flowing to the plurality of autonomous washing and drying machines of between about 5 to 15 percent.

In examples, the preprogrammed range of values includes an airflow from or to the plurality of autonomous washing and drying machines of between about 1000 to 100,000 cubic meters per hour.

In examples, the preprogrammed range of values includes an air inlet configured to introduce heated air to an autonomous washing and drying machine in a range of about 50 to 90 degrees Celsius.

In examples, the system further includes an air outlet configured to exhaust humid air during a drying cycle, wherein the preprogrammed range of values comprises a temperature of the exhausted humid air being in a range of about 30 to 50 degrees Celsius.

In examples, the controller is further configured to selectively route the one or more loads of laundry to one or more of the plurality of autonomous washing and drying machines depending at least in part on two or more characteristics of the load of household laundry. The two or more characteristics of the load of household laundry can include at least two of a size of the load of laundry, a fiber composition of one or more articles in the load of laundry, fabric finishes of one or more articles in the load of laundry, wash cycle temperature, article type of one or more articles in the load of laundry, and article thickness of one or more articles in the load of laundry. In examples, the controller is configured to receive at least one of the two or more characteristics from a network interface of a laundry separating and sorting robot in wired or wireless communication with the controller. In examples, the controller is configured to receive the two or more characteristics from a preceding robot in wired or wireless communication with the controller, and wherein the controller is further configured to estimate a drying cycle temperature range and duration based on one or more of the two or more characteristics of the load of household laundry.

In examples, at least two of the plurality of combination washing and drying machines are in a drying cycle at any time such that the heat pump remains continuously operative.

In examples, the range of values for at least one of air temperature, air flow, and air humidity includes pre-set threshold values, which adjust with time over a drying duration of a washing and drying cycle.

In examples, the at least one heater drive controls at least one of a damper, valve, and fan of each one of the plurality of autonomous washing and drying machines.

In examples, the system further includes a plurality of clusters of washing and drying machines, each one of the plurality of clusters including a plurality autonomous washing and drying machines, a heat pump, an intake manifold, and an exhaust manifold. The controller is further configured to selectively route one or more loads of household laundry to one or more clusters of washing and drying machines depending on two or more characteristics of the load of household laundry and one or more stages of washing and drying cycles of the plurality of autonomous washing and drying robots of each cluster.

In one example, a method of load balancing a heat pump in fluid communication with a plurality of combination washing and drying machines includes receiving data at a controller in operable communication via a wired or wireless network with one or more sensors, one or more microcontrollers of the plurality of washing and drying machines, and a network interface of a laundry separating and sorting robot configured to deliver a load of laundry to the plurality of washing and drying machines, the data being indicative of two or more load characteristics of a load of laundry and a cycle status of each one of the plurality of washing and drying machines. The method includes determining, based on the one or more load characteristics, a washing and drying cycle duration and sequential temperature and flow rate profiles of air and water throughout the washing and drying cycle. The method includes selecting one of a plurality of washing and drying machines for receiving the load of laundry, each one of the washing and drying machines comprising a single tub for sequential washing and drying of a single load of laundry and the single tub of the selected one of the plurality of washing and drying machines being empty. The method includes determining a washing and drying start time based on the determined cycle duration and sequential temperature profiles, and a cycle status of each one of a remainder of the plurality of washing and drying machines such that the heat pump operates to receive exhausted humid air from the plurality of washing and drying machines, cool the exhausted humid air to provide dehumidified air, and heat the humidified air for delivery to the plurality of washing and drying machines under an approximately constant load without starting up and shutting down. The method includes instructing a drive of an autonomous load filler to deliver the load of laundry to the selected one of the plurality of washing and drying machines, and initiating the washing and drying cycle at the determined start time.

Implementations of the method may include one or more of the following features.

In examples, determining the washing and drying cycle duration and sequential temperature profiles of air and water throughout the washing and drying cycle includes calculating an estimated drying time duration based on one or more load characteristics and stored relational values.

In examples, the controller is further configured to access the stored relational values from a memory store in wired or wireless communication with the controller, the stored relational values being associated with the two or more load characteristics of the load of laundry.

In examples, determining the washing and drying cycle duration and sequential temperature profiles of air and water throughout the washing and drying cycle further includes comparing the two or more load characteristics of the load of laundry to cycle duration data stored in a memory and associated with a plurality of load characteristics.

In examples, determining the washing and drying start time for the load of laundry further includes determining a washing order for the load of laundry among a plurality of start times associated with a plurality of loads of laundry contemporaneously queued for distribution among the plurality of washing and drying robots.

In examples, the two or more load characteristics include temperature and airflow cycle settings for washing and drying.

In examples, the two or more load characteristics include at least two of a size of the load of laundry, a fiber composition of one or more articles in the load of laundry, fabric finishes of one or more articles in the load of laundry, wash cycle temperature, article type of one or more articles in the load of laundry, and article thickness of one or more articles in the load of laundry.

In examples, each one of the plurality of combination washing and drying machines includes a transmittable identifier and a known physical location, and the controller is further configured to route a load of laundry to selecting one of the plurality of combination washing and drying machines at its known physical location.

In examples, operating the heat pump under an approximately constant load includes operating in steady state without any start up and shut down related variations in heat pump power usage and energy consumption over time.

In examples, the load of laundry comprises household laundry articles comprising at least one or a plurality of article sizes, a plurality of article water absorbency, and a plurality of article types.

In one example, an energy efficient autonomous laundry system includes two or more process lines configured to wash and dry a load of laundry. Each of the two or more process lines includes at least one autonomous washing and drying machine including a tub including an opening for receiving the load of laundry introduced from an automated infeed, a moveable door configured for selectively sealing the opening, an air inlet configured to introduce heated air to the tub, a temperature of the heated air being in a range of about 50 to 90 degrees Celsius, and an air outlet configured to exhaust humid air during a drying cycle, a temperature of the exhausted humid air being in a range of about 30 to 50 degrees Celsius. The system includes a manifold configured to receive and combine the exhausted humid air from the at least one autonomous washing and drying machine of each of at least two of the two or more process lines and output the combined exhausted humid air. The manifold includes at least one moveable valve for routing air flow. The system includes at least one heat pump configured to receive at an inlet the combined exhausted humid air. The at least one heat pump is configured to cool the exhausted humid air below a dew point to condense moisture from the exhausted humid air, and drain the condensed moisture to a water treatment system, and then reheat the dehumidified air to a process temperature to create process air. The system includes a second manifold to distribute the reheated process air to the at least one autonomous washing and drying machine. The system includes at least one blower to circulate the process air through the tub, the exhaust manifold, the heat pump, the intake manifold, and back to the tub. The system includes one or more sensors disposed at one or more locations including at least one of the air inlet of the at least one autonomous washing and drying machine, the air outlet of the at least one washing and drying machine, and the inlet of the at least one heat pump. The one or more sensors are configured to measure at least one air characteristic, and output a signal indicative of at least one air characteristic. The system includes a controller in operative communication with the two or more process lines, the manifolds, the at least one heat pump and the one or more sensors. The controller is configured to receive the output signal, analyze the at least one air characteristic associated with the one or more sensors disposed at one or more locations of the two or more process lines, determine, based on the analysis, whether the at least one air characteristics is within a preprogrammed range of values for at least one of air temperature, air flow, and air humidity, and adjust, in response to determining at least one air characteristic is not within a preprogrammed range of values, one or more process line controls associated with the two or more process lines. The one or more process line controls include controls for adjusting at least one of air temperature, air flow, and air humidity at the one or more locations of the two or more process lines.

Implementations of the system may include one or more of the following features.

In examples, the at least one autonomous washing and drying machine further includes a water inlet configured to introduce water to the tub at a temperature in a range of between about 5 to 60 degrees Celsius and a water outlet for emptying the tub. In implementations, the water treatment system is configured to sanitize the drained condensed moisture and output water for reuse. The output water is configured to be received by the water inlet of the at least one autonomous washing and drying machine for use with washing a subsequent load of laundry received by the tub.

In examples, the dew point of the exhausted humid air is in a range of between about 25 to 38 degrees Celsius.

In examples, one or more conduits are configured to direct the exhausted humid air from the air outlet of the at least one autonomous washing and drying machine to the manifold and one or more conduits configured to direct the combined exhausted humid air to the at least one heat pump.

In examples, the heat pump further includes a heat exchanger cooled by incoming process water at or below a temperature of 15 degrees Celsius. The heat exchanger is configured to pre-cool the exhausted humid air before introduction to the at least one heat pump.

In examples, the heat pump includes a blower to circulate the process air.

In examples, the process air is circulated by a blower external to the heat pump.

In examples, the at least one heat pump has a coefficient of performance in a range of between about 1.5 to 6.

In examples, the at least one heat pump has a coefficient of performance in a range of between about 2 to 3.

In examples, the at least one heat pump has a coefficient of performance of 2.1.

In examples, the at least one heat pump is at least one of a trans-critical, super critical and sub-critical heat pump. The at least one heat pump can be a trans-critical $CO_2$ heat pump.

In examples, the at least one heat pump includes a refrigerant. In implementations, the refrigerant is at least one of $CO_2$, ammonia, and propane.

In examples, the at least one heat pump is further configured to capture and reuse output waste heat from a compressor and a blower of the at least one heat pump to at least one of further heat process air provided to the system and heat incoming process water provided to the system.

In examples, the system is configured to direct cooled and dehumidified air output from an evaporator of the heat pump over the blower and the compressor prior to routing air through a condenser heat exchanger. In examples, the system further includes an auxiliary heater to heat the air flow beyond a temperature achieved through the combination of the waste heat and heat from the condenser heat exchanger. In examples, the compressor and blower include water cooling ducts, and incoming process water flows through the ducts to cool the blower and compressor. In examples, the system further includes one or more conduits configured to direct at least a portion of the heat to an intake manifold configured to control air flow to one or more air inlets of the at least one washing and drying machine of the two or more process lines. In examples, the system can further include an auxiliary heater configured to heat the air flow above a temperature of the waste heat. The system can include one or more conduits configured to direct at least a portion of the waste heat to process water flowing through a water inlet into the tub of the at least one washing and drying machine during a washing cycle.

In examples, the one or more sensors include at least one of an air flow, air temperature, and humidity sensor.

In examples, adjusting a preprogrammed control associated with airflow includes moving one or more of the movable valves of the hot air supply manifold to direct the hot intake air to one or more at least one autonomous washing and drying machine of each of at least two of the two or more process lines.

In examples, adjusting a preprogrammed control associated with airflow includes moving the movable valve of the manifold configured to receive and combine the exhausted humid air from the at least one autonomous washing and drying machine of each of at least two of the two or more process lines. The preprogrammed range of values can include an air temperature at the heat pump evaporator in a range of between about 15 to 30 degrees Celsius.

In examples, the heat pump includes at least one heat pump blower, compressor, and heat exchanger configured to dehumidify the humid air. The heat pump can be further configured to cool the at least one heat pump blower, compressor, and heat exchanger with the dehumidified air.

In examples, the two or more process lines include at least 6 autonomous washing and drying machines.

In examples, each of the two or more process lines includes a plurality of autonomous washing and drying machines of between about 10 to 12 washing and drying machines. In implementations, the preprogrammed range of values includes a relative humidity of process air supplied to to the plurality of autonomous washing and drying machines of between about 5 to 15 percent. In implementations, the preprogrammed range of values includes an airflow to the plurality of autonomous washing and drying machines of between about 1000 to 100,000 cubic meters per hour. In implementations, the preprogrammed range of values includes a relative humidity at the air exhausted from the plurality of autonomous washing and drying machines of between about 40 to 90 percent.

In examples, the load of laundry includes a plurality of dirty laundry articles. The plurality of dirty laundry articles include household laundry. In implementations, the system further includes a sorting device configured to batch the plurality of dirty laundry articles into one or more loads prior to automatically feeding the tub. At least one of a maximum and minimum size of each of the one or more batched loads can be predetermined so as to balance process air demands on the heat pump. The controller is further configured to selectively route the one or more batched loads to one or more autonomous washing and drying robots so as to balance process air demands on the heat pump.

In one example, an energy efficient autonomous laundry system, includes a plurality of autonomous washing and drying machines configured to wash and dry a plurality of loads of laundry. Each of the plurality autonomous washing and drying machines includes a tub including an opening for receiving a load of dirty laundry introduced from an automated infeed, a moveable door configured for selectively sealing the opening, an air inlet configured to introduce heated air to the tub, a temperature of the heated air being in a range of about 50 to 90 degrees Celsius, and an air outlet configured to exhaust humid air during a drying cycle, a temperature of the exhausted humid air being in a range of about 30 to 50 degrees Celsius. The system includes a manifold configured to receive and combine the exhausted humid air from the plurality of autonomous washing and drying machines and output the combined exhausted humid air, and the manifold includes at least one moveable valve for routing air flow. The system includes at least one heat pump configured to receive the combined exhausted humid air. The at least one heat pump is configured to cool the exhausted humid air below a dew point to condense moisture from the exhausted humid air, and drain the condensed moisture to a water treatment system. The heat pump is further configured to heat the process air and return it to the plurality of autonomous washing and drying machines through a second manifold. The manifold includes at least one moveable valve for routing air flow. The system includes one or more air sensors configured to measure at least one air at one or more locations of the system, and output a signal indicative of at least one air characteristic. The system includes a controller in operative communication with the two or more process lines, the manifolds, the at least one heat pump and the one or more sensors. The controller is configured to receive the output signal, analyze the at least one air characteristic associated with the one or more air sensors, determine, based on the analysis, whether the at least one air characteristics is within a preprogrammed range of values for at least one of air temperature, air flow, and air humidity, and adjust, in response to determining at least one air characteristic is not within a preprogrammed range of values, one or more controls for at least one of air temperature, air flow, and air humidity at the one or more locations of the system.

Implementations of the system may include one or more of the following features.

In examples, the plurality of autonomous washing and drying machines include at least 3 washing and drying machines.

In examples, the plurality of autonomous washing and drying machines include between about 6 and 12 washing and drying machines. In examples, the preprogrammed range of values includes a relative humidity of process air to the plurality of autonomous washing and drying machines of between about 5 to 15 percent. In examples, the preprogrammed range of values includes a combined airflow to the plurality of autonomous washing and drying machines of between about 1000 to 10,000 cubic meters per hour. In examples, the preprogrammed range of values includes a relative humidity at the air exhausted from at least one of the plurality of autonomous washing and drying machines of between about 40 to 90 percent. In examples, the preprogrammed range of values includes an airflow from the to the plurality of autonomous washing and drying machines of between about 1000 to 10,000 cubic meters per hour.

In examples, the load of dirty laundry includes a plurality of dirty laundry articles. The plurality of dirty laundry articles include household laundry. In examples, the system further includes a sorting device configured to batch a plurality of dirty laundry articles associated with a single customer account into one or more loads of dirty laundry prior to automatically feeding the tub. At least one of a maximum and minimum size of each of the one or more batched loads of dirty laundry can be predetermined so as to balance process air demands on the heat pump. In implementations, the controller is further configured to selectively route the one or more batched loads to one or more of the plurality of autonomous washing and drying machines so as to balance process air demands on the heat pump.

DETAILED DESCRIPTION

This disclosure relates to autonomous robotic devices, systems, and methods for handling residential loads of laundry. The system includes one or more autonomous process lines comprising a plurality of autonomous robotic devices configured to work in concert to process a dirty load of household laundry from a mass of dirty, non-uniform articles to individually separated, cleaned, and folded laundry articles. The plurality of autonomous robotic devices operate without human intervention to efficiently and effectively launder a customer's dirty items. This disclosure relates to autonomous robotic devices configured to wash and dry loads of deformable laundry articles automatically introduced and automatically removed from a combined washer dryer for introduction to a clean laundry separating robot. Laundry articles are collected from households and delivered to the process line for cleaning. The autonomous processes are time and cost efficient, eliminate human intervention-based delays, eliminate line workers and associated potential introduction of human contaminants introduced by line workers, and eliminate any concerns with having private personal items handled by strangers.

Figure 1:
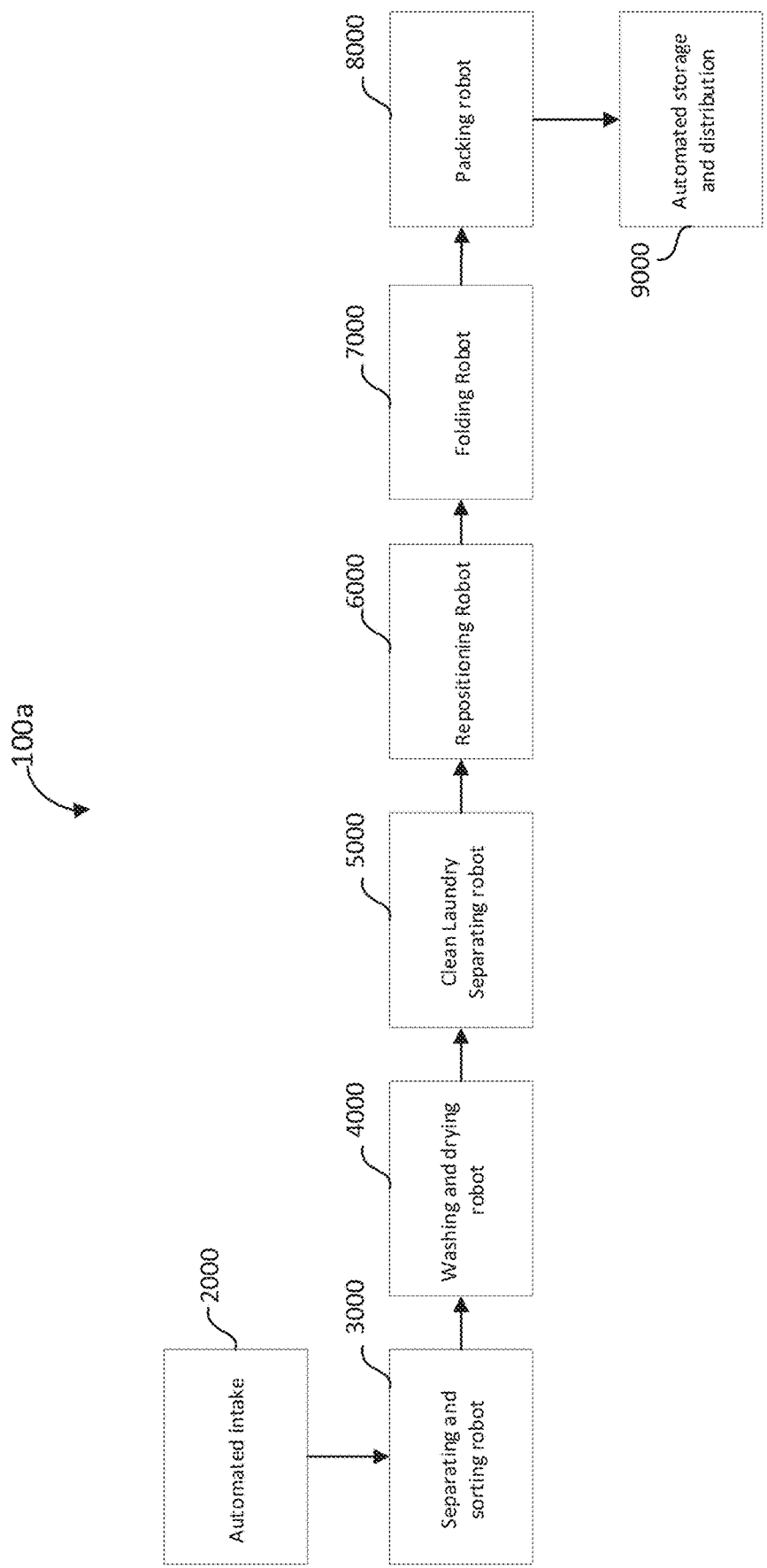
FIG. 1 depicts a schematic of an example autonomous robotic laundry process line.

As shown in FIG. 1, in implementations of the system, a process line 100a comprises a plurality of autonomous robots configured to operate in series without human intervention to process and transport dirty laundry through the cleaning process, and fold and repackage the clean laundry for return to a household. In one implementation, the process line 100a comprises an automated intake robot 2000 for receiving a load of dirty household laundry comprising a plurality of deformable laundry articles. The deformable laundry articles can be non-uniform in type, size, shape, color, and fabric. For example, the plurality of deformable laundry articles can include items commonly laundered in homes, such as sheets, towels, table cloths, and adult and children's garments, for example, tee shirts, pants, socks, undergarments, dresses, dress shirts, and blouses. The autonomous intake robot 2000 is configured to introduce the plurality of deformable laundry articles to a separating and sorting robot 3000 configured to separate out each one of the deformable laundry articles of the plurality of deformable laundry articles. In implementations, the separating and sorting robot 3000 is configured to sort each one of the separated deformable laundry articles into one or more related batches, or loads, for washing. In implementations, the separating and sorting robot 3000 is configured to intelligently batch the separated each one of the deformable laundry articles according to a programmed sorting algorithm based, for example, on criteria including at least one of material color, material type, customer washing preference, water temperature requirements, and load size. In implementations, the separating and sorting robot 3000 is configured to identify and record the number and types of garments in the load of laundry and provide this information to one or more robots in the process line 100a.

The separating and sorting robot 3000 outputs one or more intelligently sorted batches of deformable laundry articles to one or more washing and drying robots 4000 for laundering. The one or more washing and drying robots 4000 output the clean laundry articles to a clean laundry separating robot 5000. Implementations of the clean laundry separating robot 5000 can be similar or identical to the separating and sorting robot 3000. The clean laundry separating robot 5000 is configured to separate a load of clean laundry into individual deformable laundry articles for introduction into a repositioning robot 6000. In implementations, the repositioning robot 6000 receives a single deformable laundry article and manipulates and repositions it for automated introduction into a folding robot 7000, which automatically folds the laundry article for introduction to a packing robot 8000. In implementations, the packing robot 8000 automatically and autonomously packs the clean load of laundry comprising the plurality of clean and folded deformable laundry articles in a shipping container for automated redistribution to the customer. In implementations, the shipping container is a reusable container. In implementations, the shipping container is a disposable container. In implementations, the shipping container is a non-deformable container with an ingress protection rating that includes an intrusion protection rating of 5 or 6 and a moisture protection rating of any and all of 1 through 6 in accordance with the Ingress Protection Code, IEC standard 60529.

Figure 2:
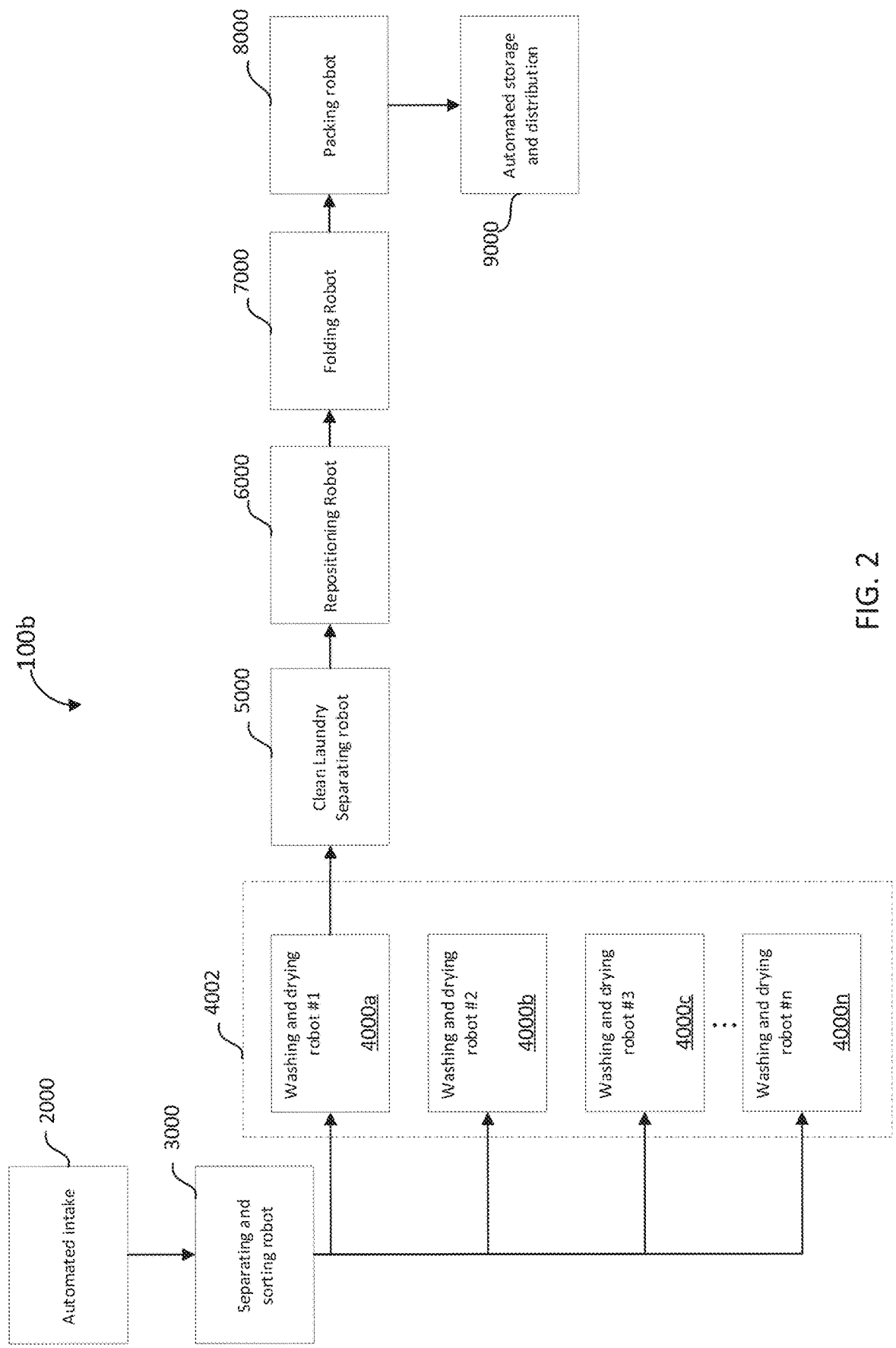
FIG. 2 depicts a schematic of an example autonomous robotic laundry process line including one intake and output and a plurality of washing and drying robots.
Figure 3:
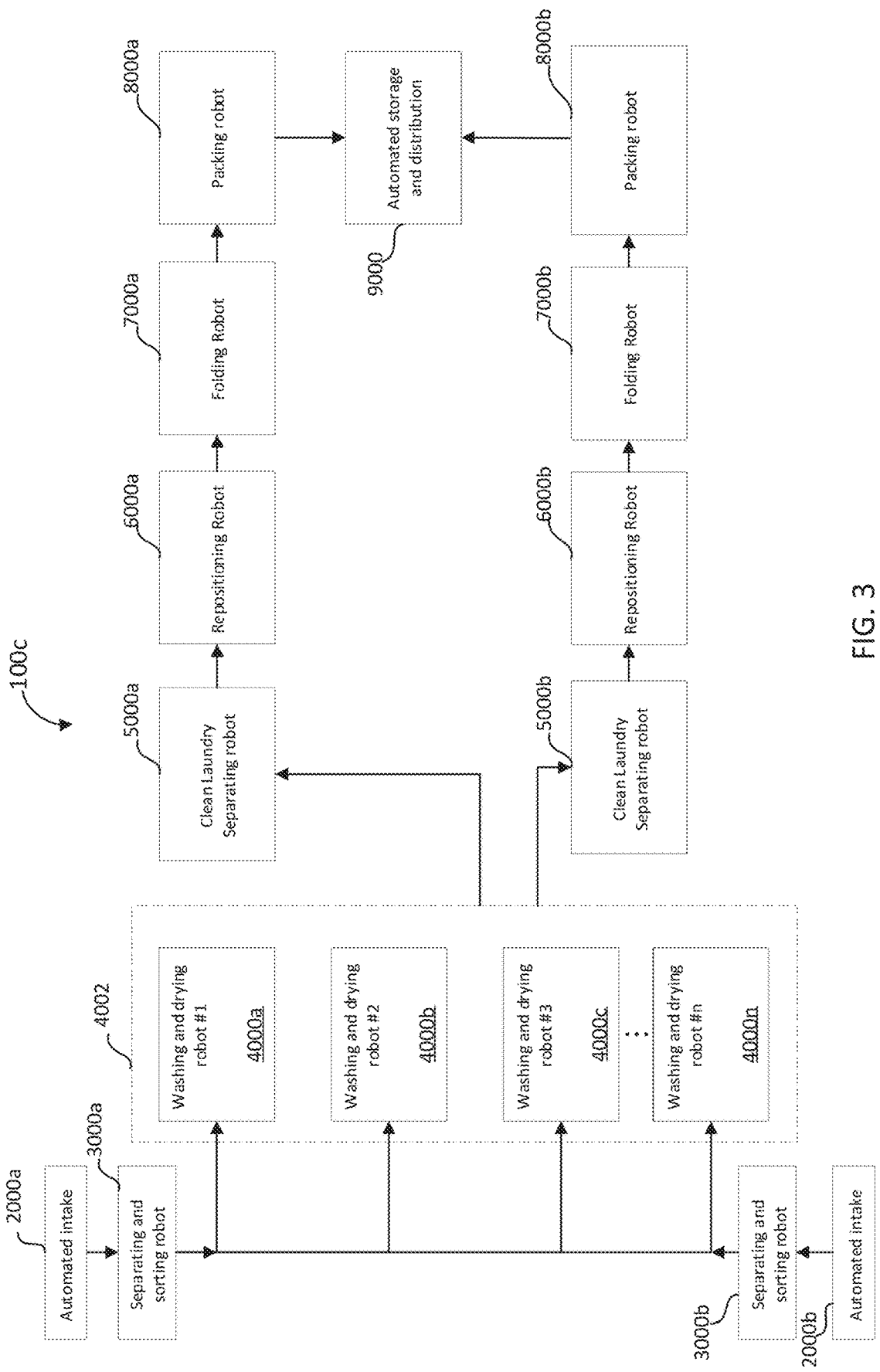
FIG. 3 depicts a schematic of a plurality of autonomous robotic laundry process lines including a plurality of intakes processing paths and output processing paths and a plurality of washing and drying robots.

Implementations of the process line 100a of household laundry cleaning robots can comprise one or more of each of the robots depicted in FIG. 1. For example, as shown in FIG. 2, each autonomous process line 100b can include a or cluster 4002 comprising a plurality of washing and drying robots 4000a-n, wherein "n" represents a total number of robots in the cluster 4002. In implementations, a cluster 4002 comprises a plurality of combination (e.g., dual purpose, single drum) washing and drying robots 4000a-n ranging between about 3 to 120 washing and drying robots 4000a-n. In implementations, a cluster 4002 comprises between about 6 to 24 washing and drying robots 4000a-n. In implementations, a cluster 4002 comprises around 12 washing and drying robots 4000a-n. In other implementations, as shown in FIG. 3, the autonomous process line 100c includes a cluster 4002 of combination washing and drying robots 4000a-n shared by two or more sets of automated intake robots 2000a-b and dirty laundry separating and sorting robots 3000a-b and two or more sets of clean laundry separating robots 5000a-b, repositioning robots 6000a-b, folding robots 7000a-b, and packing robots 8000a-b. In implementations, each washing and drying robot 4000, 4000a-n comprises a single tub for sequential washing and drying of a single load of laundry. Additionally, two or more of the robots can be combined in a single module in alternate implementations. In implementations, one or more of the robots in the process line 100a-c are configured to communicate over wired connections or wireless communication protocols. For example, in implementations, one or more robots in the process line 100a-c can communicate with another one or more robots in the process line 100a-c over a wired BUS, LAN, WLAN, 4G, 5G, LTE, Ethernet, BLUETOOTH, or other IEEE 801.11 standard.

Figure 4:
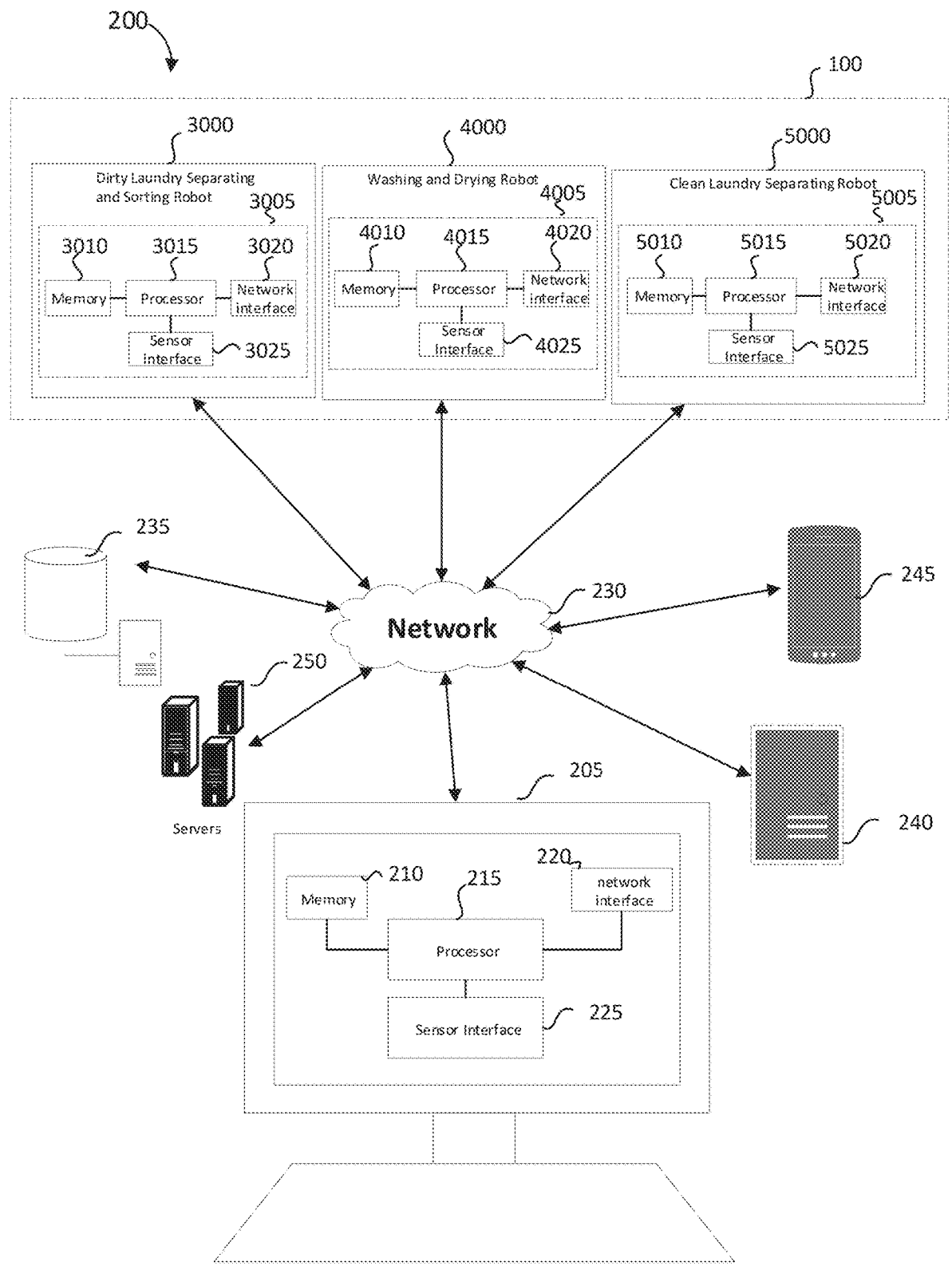
FIG. 4 depicts a schematic example of a system for controlling an autonomous robotic laundry process line.

Referring to FIG. 4, an example of a communication and interoperative control system 200 of operatively connected robots is shown. FIG. 4 depicts a schematic implementation of a portion of an automated robotic process line 100, 100a-c. A washing and drying robot 4000 is in operative communication with a dirty laundry separating and sorting robot 3000 configured to provide sorted and batched loads of dirty deformable laundry articles to the washing and drying robot 4000 for washing and drying. The washing and drying robot 4000 is in operative communication with a clean laundry separating robot 5000 and outputs a load of clean laundry for separation by the clean laundry separating robot 5000. Each robot 3000, 4000, 5000 includes a controller 3005, 4005, 5005 configured to operate the associated robot.

For example, in implementations, the washing and drying robot 4000 includes a controller 4005. The controller 4005 includes a processor 4015 in communication with a memory 4010, a network interface 4020, and a sensor interface 4025. The processor 4015 can be a single microprocessor, multiple microprocessors, a many-core processor, a microcontroller, and/or any other general purpose computing system that can be configured by software and/or firmware. In implementations, the memory 4010 contains any of a variety of software applications, data structures, files and/or databases. In one implementation, the controller 4005 includes dedicated hardware, such as single-board computers, application specific integrated circuits (ASICs), and field programmable gate arrays (FPGAs).

A network interface 4020 is configured to couple the controller 4005 to a network 230. The network 230 may include both private networks, such as local area networks, and public networks, such as the Internet. It should be noted that, in some examples, the network 230 may include one or more intermediate devices involved in the routing of packets from one endpoint to another. In implementations, the network interface 6020 is coupled to the network 230 via a networking device, such as a bridge, router, or hub. In other implementations, the network 230 may involve only two endpoints that each have a network connection directly with the other. In implementations, the network interface 4020 supports a variety of standards and protocols, examples of which include USB (via, for example, a dongle to a computer), TCP/IP, Ethernet, Wireless Ethernet, BLUETOOTH, ZigBee, M-Bus, CAN-bus, IP, IPV6, UDP, DTN, HTTP, FTP, SNMP, CDMA, NMEA and GSM. To ensure data transfer is secure, in some examples, the controller 4005 can transmit data via the network interface 4020 using a variety of security measures including, for example, TLS, SSL or VPN. In implementations, the network interface 4020 includes both a physical interface configured for wireless communication and a physical interface configured for wired communication. According to various embodiments, the network interface 4020 enables communication between the controller 4005 of the washing and drying robot 4000 and at least one of the plurality of robots 2000, 3000, 5000, 6000, 7000, 8000, 9000 of the process line 100, 100a-c.

Additionally or alternatively, the network interface 4020 is configured to facilitate the communication of information between the processor 4015 and one or more other devices or entities over the network 230. For example, in implementations, the network interface 4020 is configured to communicate with a remote computing device such as a computing terminal 205 (alternatively referred to herein as "CPU 205"), database 235, server 240, smartphone 245, and server farm 250. In implementations, the network interface 4020 can include communications circuitry for at least one of receiving data from a database 235 and transmitting data to a remote server 240, 250. In some implementations, the network interface 4020 can communicate with a remote server over any of the wired protocols previously described, including a WI-FI communications link based on the IEEE 802.11 standard.

In some examples in accordance with FIG. 4, the network 230 may include one or more communication networks through which the various autonomous robots and computing devices illustrated in FIG. 4 may send, receive, and/or exchange data. In various implementations, the network 230 may include a cellular communication network and/or a computer network. In some examples, the network 230 includes and supports wireless network and/or wired connections. For instance, in these examples, the network 230 may support one or more networking standards such as GSM, CMDA, USB, BLUETOOTH®, CAN, ZigBee®, Wireless Ethernet, Ethernet, and TCP/IP, among others. In implementations, the network 230 can implement broadband cellular technology (e.g., 2.5 G, 2.75 G, 3 G, 4 G, 5 G cellular standards) and/or Long-Term Evolution (LTE) technology or GSM/EDGE and UMTS/HSPA technologies for high-speed wireless communication.

Although the controller 4005 is described herein in particular, one or more of the plurality of robots 2000, 3000, 5000, 6000, 7000, 8000, 9000 of the process line 100 includes similar components having similar functionality.

Returning to FIGS. 1-3, implementations of a process line 100, 100a-c for washing and drying one or more loads of dirty laundry are shown. In implementations, a large-scale, autonomous laundry facility includes a plurality of process lines 100, 100a-c and a plurality of autonomous washing and drying robots 4000, 4000a-n, which intake process water, output grey water after washing loads of laundry, and output cool, humid air after drying loads of laundry with heated intake process air. The intake air may be heated by an electric resistance heater, gas furnace, geothermal heat, or any means known in the art. Additionally, in implementations, the intake air can be heated using an electric heat pump configured to utilize the exhaust air stream as its heat source, thereby also providing dehumidification. While a heat pump may be used to heat the air in any single dryer, inefficiencies and costs can make that configuration cost prohibitive. As will be described subsequently with regard to implementations, combining the air flow from three or more machines addresses these issues and makes the heat pump an attractive solution in a laundry facility because of the efficiency gains and energy recapture. In implementations, the use of a heat pump to heat the air enables the configuration of a closed-loop process air cycle. In implementations, each washing and drying robot 4000, 4000a-n can be an electric combination washer and dryer device with a single tub for sequential washing and drying of a single load of laundry. Challenges of energy reclamation within a cluster 4002 of washing and drying robots 4000a-n include load balancing temperature, humidity, water use, and water treatment and recycling across the plurality of combination washing and drying robots 4000, 4000a-n within a cluster 4002. In implementations, one or more clusters 4002 of washing and drying robots 4000, 4000a-n can include an active heat pump in fluid communication with the cluster. Heat pumps operate most efficiently in a narrowly consistent range of air flow, air temperature, and humidity conditions. In implementations, efficiency gains and energy recapture are configured to be optimized across a plurality of electrical washing and drying robots 4000, 4000a-n within a process line and or between two or more clusters 4002 of two or more process lines under computer control for system load balancing at optimum heat pump operational parameters.

In implementations, the plurality of autonomous washing drying robots 4000 can comprise two or more clusters of combination washing and drying robots, each cluster dedicated to one of the two or more process lines for load balancing at a facility level scale. Alternatively, in implementations, the efficiency gains and energy recapture can be optimized within a single cluster 4002 of washing and drying machines 4000a-n. In implementations, load balancing can include balancing at least one of wash and dry temperatures, air flow rates, wash and dry cycle start times, washing order of batched (e.g. autonomously separated and intelligently sorted into batches) loads of laundry distributed among at least one of the plurality of washing and drying robots 4000a-n in a single cluster 4002 or between two or more clusters 4002, and size of individual loads of deformable laundry articles divided and batched into loads from each customer household's laundry. For example, a small load comprises a weight in a range of up to about 3 kg, a medium sized load comprises a weight in a range of between about 3-5 kg, and a large load comprises a weight in a range of between about 5-10 kg. In addition to the load balancing of active heat pump operation, implementations of the one or more process lines 100, 100a-c can further comprise a co-located water treatment and recycling system for recycling process water and reclaiming condensed water from the active heat pump back into the process line.

Figure 5:
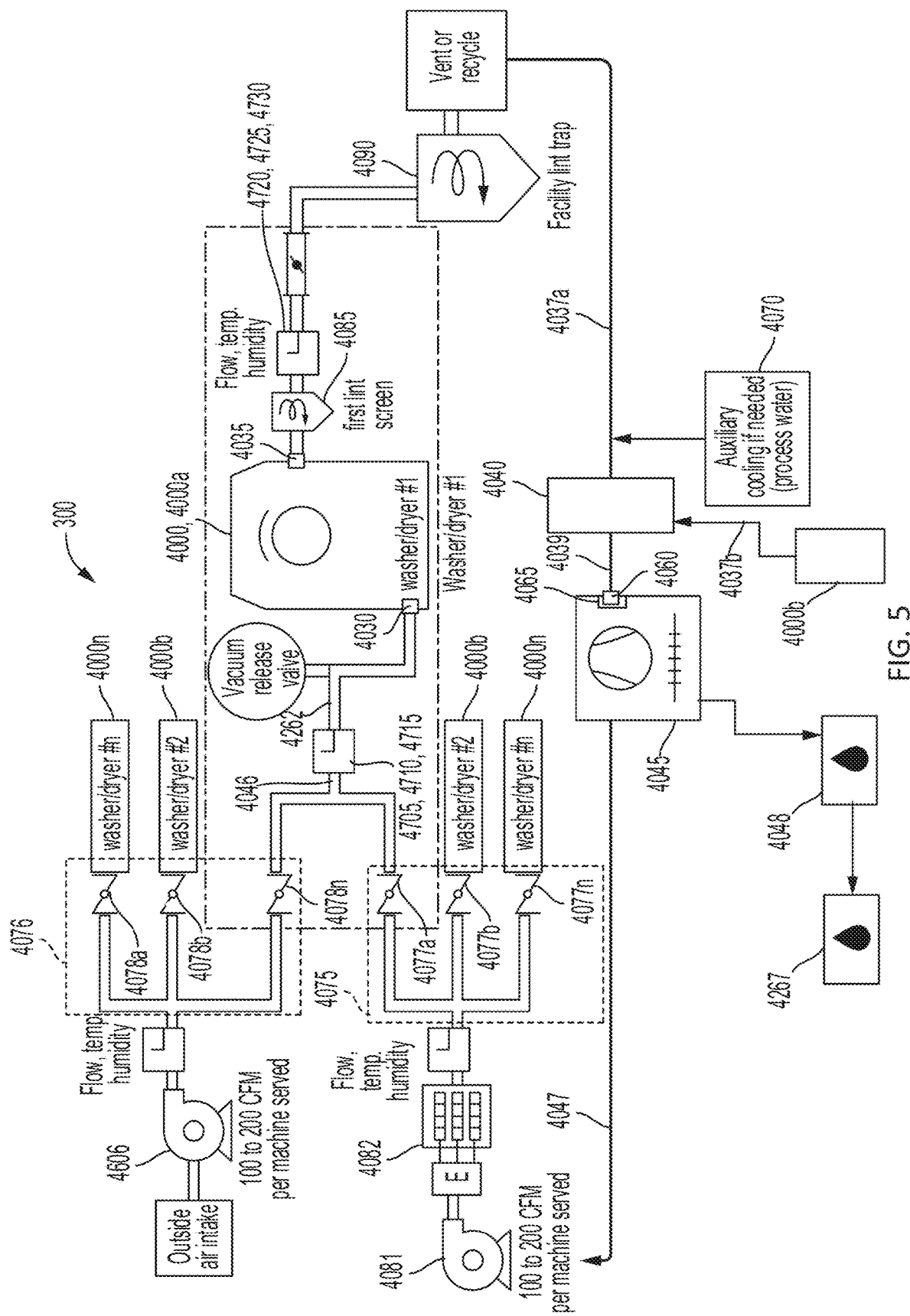
FIG. 5 depicts a schematic example of an autonomous system for washing and drying laundry in accordance with the process lines of FIGS. 1-3 and system of FIG. 4.
Figure 6:
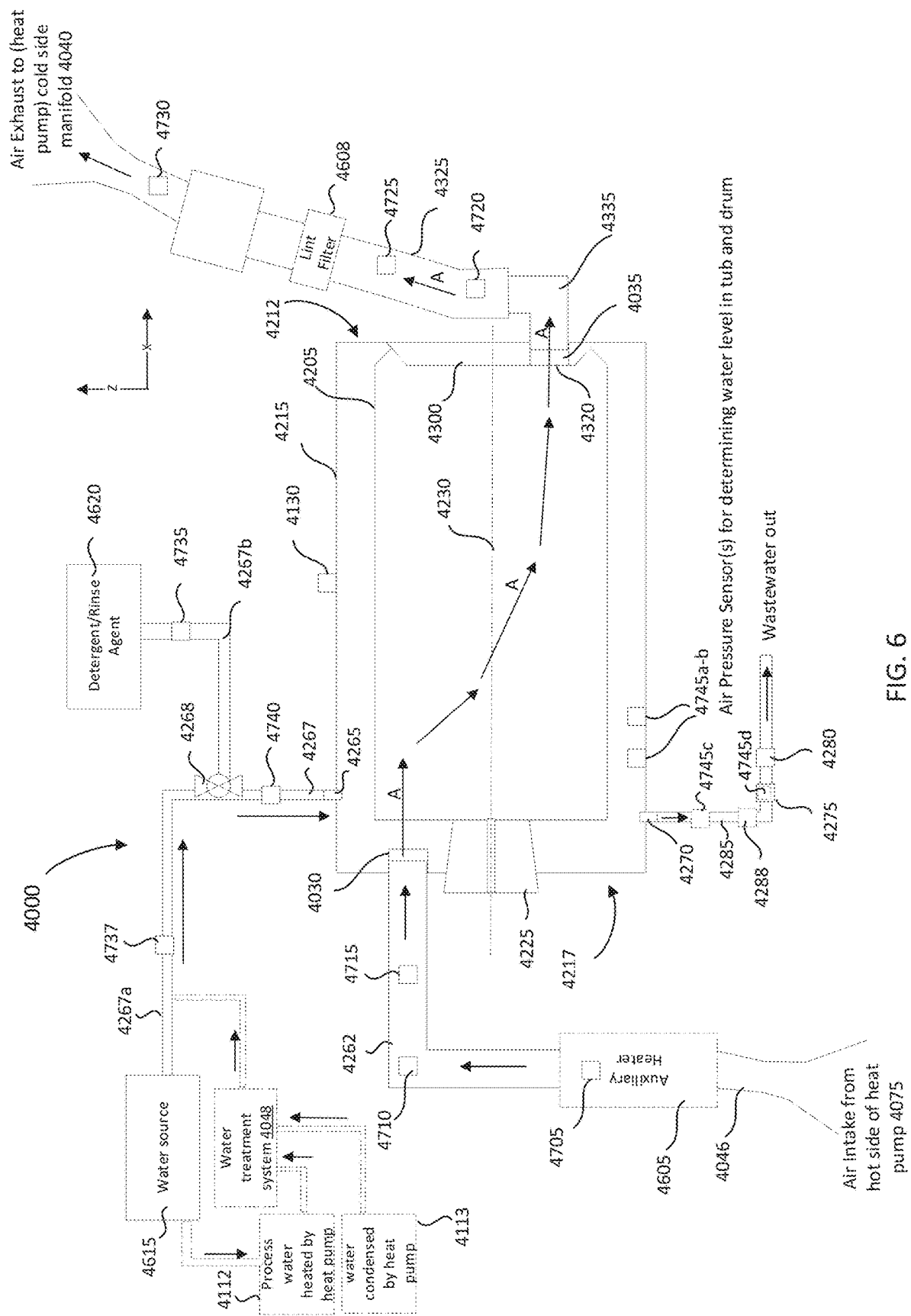
FIG. 6 depicts a side cross section schematic of an implementation of inputs and outputs and sensors of an individual autonomous washing and drying device.

Referring now to FIG. 5, in implementations, an energy efficient automated laundry system 300 comprises a plurality of combination washing and drying robots 4000, 4000a-n (hereinafter alternatively referred to as a "cluster 4002" of washing and drying robots 4000a-n) comprising a circuit of process air and process water routed and recycled between and through two or more of a plurality of washing and drying robots 4000a-n of the cluster 4002. For simplicity of description, a single washing and drying robot 4000 is depicted in the laundry system 300 schematic of FIG. 5. In implementations, an energy efficient automated laundry system 300 comprises at least one cluster 4002 of washing and drying robots 4000, 4000a-n each comprising a single drum, or tub 4215, configured to sequentially wash and dry loads of laundry. As shown in FIG. 6, each washing and drying machine 4000 comprises a tub opening in a front end 4212 of the tub 4215 for receiving the load of laundry introduced from an automated infeed, a moveable door 4300 configured for selectively sealing the opening, an air inlet 4030, and an air outlet 4035.

As depicted in FIGS. 5 and 6, during the drying cycle each washing and drying machine 4000a-n intakes hot process air through inlet 4030 and exhausts cool humid process air through outlet 4035. In implementations, as shown in FIG. 5, the exhausted process air passes through one or more lint removal devices 4085. In implementations, the lint removal device comprises a fine mesh screen. In implementations, the plurality of washing and drying robots 4000a-n in a cluster 4002 are in fluid communication with a system level lint removal device 4090 configured to filter lint from the exhausted process air of one or more washing and drying machines 4000 of the cluster. The system 300 further comprises at least one exhaust manifold 4040 in operable communication with at least one of the controller 4005 and a computer terminal 205. The at least one exhaust manifold 4040 is configured to receive and combine the exhausted humid air from a plurality of washing and drying robots 4000a-n, for example, the at least one washing and drying robot 4000 of each of at least two of the two or more process lines 100, 100a-c or the plurality of washing and drying robots 4000a-n comprising a cluster 4002 of washing and drying robots 4000a-n. In implementations, the exhaust manifold 4040 comprises at least one moveable valve for routing air flow. From the manifold 4040 the combined exhausted humid air is conveyed to at least one heat pump 4045 through one or more conduits 4039. The manifold 4040 combines the exhausted humid air from a plurality of washing and drying robots 4000a-b thereby removing or lessening temperature and humidity variations in the stream of humid air input to the heat pump 4045. In implementations, the exhaust manifold 4040 is disposed after the system level lint removal device 4090. Alternatively, in implementations, the exhaust manifold 4040 can be disposed between the plurality of washing and drying machines 4000a-n of a cluster and system level lint removal device 4090.

As will be described subsequently with regard to implementations, the heat pump 4045 further cools the air stream of process air routed from the exhaust manifold 4040, causing some of the moisture vapor contained therein to condense. The heat pump 4045 then heats the air to a preset process intake temperature. The heat pump 4045 distributes the heated air through an intake manifold 4075 to the input ports of one or more of the plurality of washing and drying machines 4000a-n in the cluster 4002. In implementations, the circulation of process air is driven by a central blower 4081 disposed between the heat pump 4045 and the intake manifold 4075. Additionally or alternatively, in implementations, the circulation of process air through the system 300 is driven by a central blower (not shown) located between the exhaust manifold 4040 and the heat pump 4045. In implementations, the circulation of process air through the system 300 is driven by a blower (not shown) integrated into the heat pump 4045.

In implementations the intake manifold 4075 comprises at least one moveable valve 4077, 4077a-n for routing air flow to one or more of the plurality of washing and drying machines 4000a-n. In implementations, the system 300 comprises an auxiliary booster heater at any desired position between the heat pump 4045 and the intake manifold 4075 to further raise the temperature of the process air or to compensate for losses in the ducting. In implementations, each one of the plurality of washing and drying robots 4000a-n is disposed in operable connection with at least one of an associated damper 4077a-n of the intake manifold 4075, a associated damper 4078a-n of the fresh air manifold 4076, and an auxiliary heater 4605, the operation and control of any of which and any combination of which enables local control of the process air temperature.

In some implementations, it is desirable to operate some drying cycles or partial drying cycles at temperatures below the temperature of the air stream at the intake manifold 4075. In implementations, the system further comprises a fresh air intake (e.g., outdoors environmental air external to a laundry facility housing the one or more process lines 100, 100a-n), a blower for fresh air 4606, and a fresh air manifold 4076 comprising at least one movable valve. At each washing and drying machine 4000a-n fresh air and heated process air are mixed in proportion to achieve the desired temperature through the setting of moveable dampers 4077a-n and 4078a-n operated by the controller 4005, 4005a-n, and/or CPU 205. The mixed (e.g., tempered) intake air is then introduced into a washing and drying machine 4000 through conduit 4046 and intake port 4030.

FIG. 6 illustrates in more detail the operation and air flow path through one of the plurality of washing and drying machines 4000a-n. With the door 4300 sealed in place in the opening of the drum, an airflow A is established from the intake manifold 4075, through the machine and exhausted to a cold side exhaust manifold 4040 (e.g., the exhaust manifold 4040 adjacent the cold side of the heat pump 4045). As shown in FIG. 6, in implementations, the sealed door 4300 is configured to fixedly receive an air vent hose 4325 extending therefrom. In implementations, the air vent hose 4325 is flexible to accommodate movement of the door 4300 during attachment and removal to the drum 4205 and to accommodate motion and vibration during the washing and drying cycle. In implementations, the air outlet orifice 4035 and a rigid conduit 4335 to which the air vent hose 4325 attaches are disposed at or around the center of the door 4300. In implementations, the air outlet orifice 4035 and rigid conduit 4335 to which the air vent hose 4325 attaches are disposed on a lower half of the door 4300 (e.g., below a spin axis 4230). An air inlet orifice 4030 is disposed through a drive end 4217 of the tub 4215 such that air flows through the drum from the air inlet orifice 4030 to the air outlet orifice 4035 as indicated by the arrows of FIG. 6 (e.g., airflow A). Because the air inlet orifice 4030 is positioned adjacent the top of the tub 4215 and the air outlet orifice 4035 is positioned adjacent the bottom of the tub 4215, the flow of air (e.g., airflow A) travels diagonally downward through the drum 4205 from the drive end 4217 to the front end 4212. Alternatively, the air inlet orifice 4030 could be positioned adjacent the bottom of the tub 4215 and the air outlet orifice 4035 is positioned adjacent the top of the tub 4215 to achieve an alternate diagonal airflow upward through the drum 4205. A diagonal airflow A ensures effective mixing of the air in the drum 4205 so that a load of one or more deformable laundry articles disposed therein dries uniformly, with no hot spots or cold spots. By avoiding a narrow, direct air path through the drum 4205, deformable articles throughout the drum are heated and therefore dried efficiently, avoiding longer drying cycles associated with less distributed heating throughout the drum 4205.

In implementations, as shown in FIG. 6 in broken lines to indicate optional inclusion in the system, an optional auxiliary heater 4605 further heats the intake air, introducing warm, dry air into the tub 4215 through the inlet orifice 4030 in the drive end 4217 of the tub 4215. In implementations, the system further comprises one or more heat control elements comprising at least one of an electrically controlled damper, a blower, an auxiliary heater, or a combination thereof. The inlet orifice 4030 is parallel to the drum spin axis 4230 and located outside the diameter of a drive motor 4225 (e.g., for direct drive) or drive motor pulley (e.g., for belt drive). In implementations, the heated dry air passes through a mesh or perforations in the end wall of the drum 4205 and then passes through the volume occupied by tumbling laundry articles (e.g., at least one deformable article). In some implementations a blower (not shown) may be placed downstream to pull the air through the volume. The air stream passes through the drum 4205 where it absorbs moisture from the at least one deformable article. The moist air is vented from the drum 4205 through a meshed opening (e.g., the air outlet orifice 4035) at the front of the tub 4215. In addition to the air inlet orifice 4030 and air outlet orifice 4035, the tub 4215 comprises a cleaning water inlet and a wastewater outlet 4270, as shown in FIG. 6.

In addition to the air and liquid inlets and outlets to the tub 4205, in implementations, the washing and drying robot 4000 additionally comprises one or more of temperature, humidity, water level (e.g., air pressure), and flow sensors configured to detect measured characteristics of the air and liquid flowing into and out of the tub and drum assembly 4200 and communicate these measured characteristics to the controller 4005. For example, as depicted in the schematic of FIG. 6, the device 4000 can include, in implementations, one or more of a temperature sensor 4705 disposed at or on the auxiliary heater 4605, and one or both of a temperature and humidity sensor 4710 and airflow sensor 4715 disposed in a heated air conduit 4262 mated to the air inlet orifice 4030 of the tub 4215. The controller 4005 receiving signals from one or more of these sensors can then control the system heat control elements such as dampers 4077a-n and 4078a-n and/or the power to auxiliary heater 4605 for adjusting the air to maintain values within one or more temperature, humidity, and flow rate thresholds.

For example, in implementations, the controller 4005 can adjust the inlet air temperature based at least in part on the ambient humidity. The controller 4005 can control the air flow rate based on temperature and humidity of the exhaust air. In implementations, one or more of an airflow sensor 4720 and one or more of temperature and humidity sensors 4725, 4730 can be disposed in the air vent hose 4325, in close proximity to the port and within the stream of cooled, humid air exhausted from the drum 4205. The controller 4005 receiving signals from one or more of these sensors can then control the temperature, damper positions for intake heated process air and intake fresh air, and/or power level of auxiliary heater 4605 to maintain values within one or more temperature, humidity, and flow rate thresholds.

In implementations, one or more flow sensors 4735, 4737, 4740 can be disposed in the cleaning water conduits 4267, 4267a-b. For example, one or more flow sensors 4735 can be disposed downstream of the detergent/rinse agent source 4620 and provide feedback to the controller 4005 actuating the valve 4268 to introduce a measurable amount of detergent/rinse agent to the tub 4215 and drum 4205. Similarly, one or more flow sensors 4737 can be disposed downstream of the water source 4615 and provide a signal to the controller 4005 to control the rate of flow of water to the tub 4215 and drum 4205, and a one or more flow sensors 4740 can be disposed downstream of the valve 4268 introducing detergent/rinse agent to the water from the water source 4615 and provide a signal to the controller 4005 to control the rate of flow of wash water (e.g., water and detergent and/or rinse agent) to the tub 4215 and drum 4205.

In implementations, a temperature of the heated air at the air inlet 4030 comprises about a range of about 50 to 90 degrees Celsius. In implementations, the temperature of the heated air comprises a range of about 50 to 75 degrees Celsius. In implementations, the heated air comprises a relative humidity in a range of between about 3 to 25 percent. In implementations the relative humidity of the heated air is about 5 percent. In implementations, a lower or upper temperature and or relative humidity limit can be set at the controller 4005 of the washing and drying robot 4000 or another processor in networked communication, such as that of a computing terminal 205, configured to control the plurality of washing and drying robots 4000, 4000*a-n* in one or more clusters 4002, 4002*a-n*. The lower limit can be set depending on a plurality of input factors including at least one of ambient air temperature and humidity, geographical location, outside air temperature and humidity, and the presence of static electricity.

Heat pumps have a maximum allowable temperature at the intake to their evaporator. Because the mechanical work of the heat pump 4045 continuously generates heat, it is possible for the process air temperature to spiral upward over time, which in turn may cause the temperature of the exhaust from washing and drying machine 4000*a-n* to rise above the maximum temperature acceptable at the input to the heat pump. To address this, in implementations, the system 300 comprises an auxiliary heat exchanger 4070 to pre-cool the humid air prior to introduction to the heat pump 4045. In implementations, an optimal air temperature for drying is in a range of between about 50 C to 70 C and an optimal temperature range for condensing at the heat pump 4045 is in a range of between about 15 C to 30 C. Additionally or alternatively, in implementations, process water in a temperature range of about 5 to 20 degrees Celsius can be introduced to the auxiliary heat exchanger 4070 to pre-cool the humid air. The process water is therefore pre-heated through this exchange and reduces the energy demand for heating process water elsewhere in the plant of one or more process lines 100, 100*a-n*.

Figure 7:
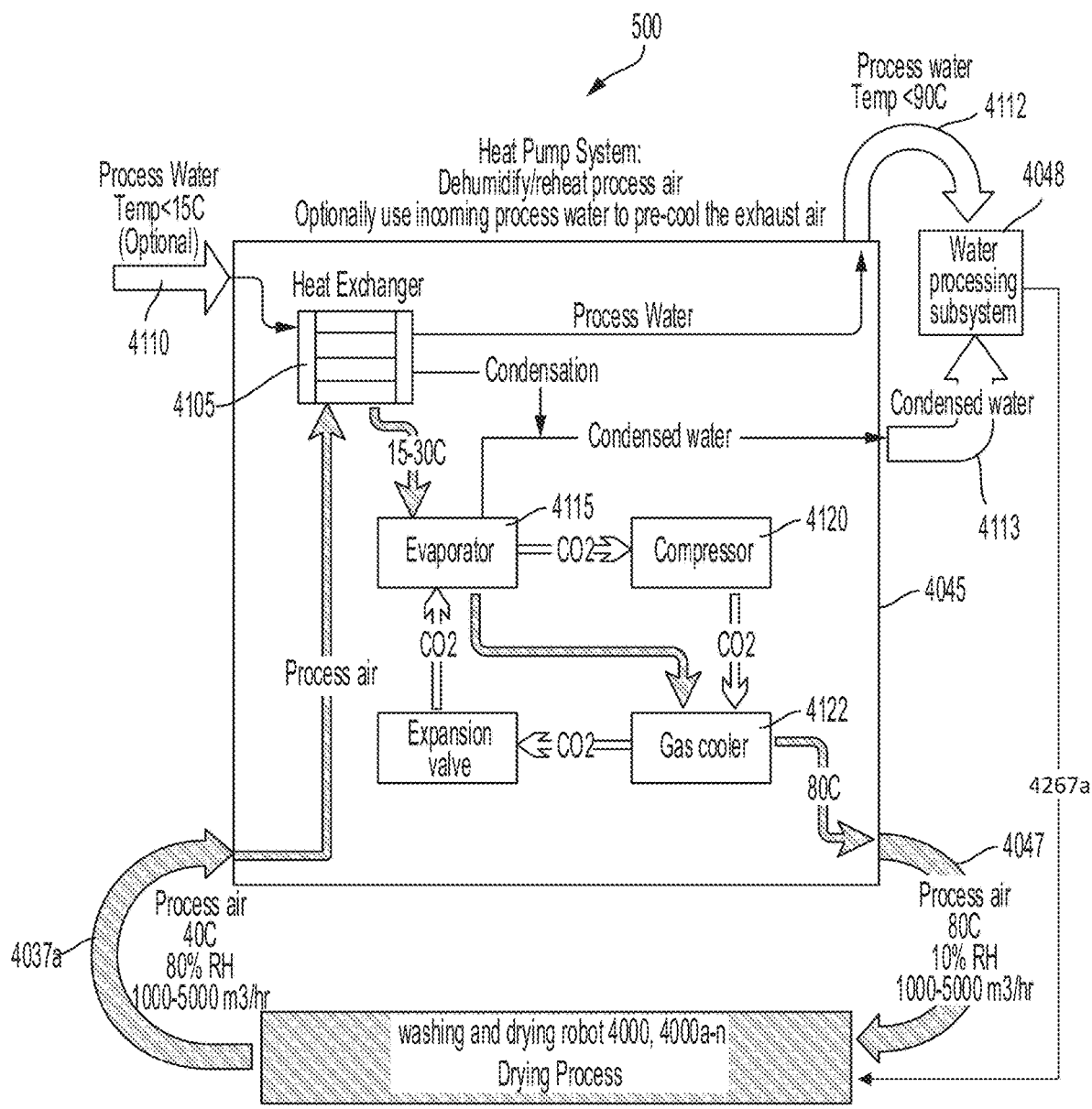
FIG. 7 depicts a schematic example of a portion of the autonomous system of FIG. 5 depicting fluid flows in a heat pump.

In implementations, as shown in FIG. 7, the at least one heat pump 4045 can operate as a dehumidifier. For clarity, the airflow paths are depicted with shaded arrows comprising a slanted line pattern and thin lined arrows indicate water flow through the heat pump system 500. The at least one heat pump 4045 is configured to cool the exhausted humid air below a dew point to condense moisture from the exhausted humid air and drain the condensed moisture to a water treatment system 4048. In implementations, exhausted humid air enters a heat pump evaporator heat exchanger. The air is cooled to below its dew point, moisture condenses on a heat exchanger, and the heat pump drains the condensed moisture into the water treatment system for reuse as process water. In implementations, the dew point of the exhausted humid air entering the heat exchanger is in a range of between about 25 and 38 degrees Celsius.

As described previously with regard to FIGS. 5 and 6, in implementations, one or more sensors 4705, 4710, 4715, 4720, 4725, 4730, 4060 are disposed at one or more locations comprising at least one of the air inlet 4030 of each one of the washing and drying machines 4000*a-n*, the air outlet 4035 of each one of the washing and drying machine, and the inlet of the at least one heat pump. The one or more sensors 4705, 4710, 4715, 4720, 4725, 4730, 4060 are configured to measure at least one air characteristic such as temperature, air flow velocity, air flow volume, moisture content, and air pressure, and output a signal indicative of at least one air characteristic to the controller 4005*a-n* and/or CPU 205. In implementations, the one or more sensors comprise at least one of semiconductor, bimetallic, or resistive temperature sensors, polymer or wet bulb humidity sensors, mechanical, hot wire, and pitot tube air velocity sensors.

In implementations, a controller 4005*a-n* and/or CPU 205 is in operative communication with a fresh air manifold 4076 and associated plurality of dampers 4078*a-n*, an intake manifold 4075 and associated dampers 4077*a-n*, an exhaust manifold 4040, at least one heat pump 4045, one or more sensors disposed within and proximate each one of the plurality of washing and drying robots 4000*a-n* of a cluster 4002 and between a plurality of clusters 4002*a-n*, and, in some implementations, an auxiliary heater 4605 disposed proximate at least one of the plurality of washing and drying robots in a cluster. As described previously and as will be described subsequently in more detail with regard to implementations, the controller is configured to load balance the energy and water usage across the laundry facility comprising two or more clusters 4002*a-n*, for example, one or more of the controller 4005 of one or more of the washing and drying robots 4000, 4000*a-n* or another processor in networked communication, such as that of a computing terminal 205. In implementations, the controller comprises a processor 215 of the computing terminal 205 communicating with each controller 4005 of each of the plurality of washing and drying robots 4000, 4000*a-n*.

In implementations, the controller 4005*a-n* and/or CPU 205 is configured to optimize the process parameters within a cluster 4002 and/or across two or more clusters 4002*a-n* based on target values determined in advance based on tradeoffs energy efficiency, cycle time, and fabric care and utilizing an active feedback control loop for adjusting air and water flow rates and temperatures. The controller is configured to receive the output signal, and analyze the at least one air characteristic associated with the one or more sensors 4705, 4710, 4715, 4720, 4725, 4730, 4060 disposed at one or more locations of each of cluster 4002 and each washing and drying machine 4000, 4000*a-n*. The one or more sensors comprise at least one of an air flow, air temperature, and humidity sensor. For each cluster 40002, the controller 4005*a-n* and/or CPU 205 is further configured to determine, based on the analysis, whether the at least one air characteristic is within a preprogrammed range of values for at least one of air temperature, air flow, and air humidity, and adjust, in response to determining at least one air characteristic is not within a preprogrammed range of values, one or more system controls. The system controls are associated with each cluster 4002, 4200*a-n* of a process line 100, 100*a-c*, and can comprise controls for adjusting at least one of air temperature, air flow, and air humidity at the one or more locations within each cluster 4002 and/or between clusters 4200*a-n* of two or more process lines 100*a-n*. For example, in implementations, the controller is configured to at least one of open or partially close a damper (e.g., 4077a-n, 4076a-n,) in at least one of the manifolds 4075 or 4076 to adjust the flow volume of hot air and the proportion of hot process air and fresh air, turn on an auxiliary heater 4605 if a higher temperature is additional heating is required, and turn on or increase process water flow through a heat exchanger 4070 for additional cooling to either further reduce the humidity or to lower the process temperature to protect delicate fabrics. Additionally or alternatively, as will be described subsequently with regard to implementations, the controller 4005 and/or CPU 205 can be configured to implement scheduling algorithms and artificial intelligence for predictive load balancing of energy use across and among the plurality of washing and drying robots 4000, 4000a-n based on one or more load characteristics, wash cycle parameters, and a cycle status for each washing and drying robot 4000, 4000a-n in at least one of a cluster 4002 and a plurality of clusters 4000a-n in a laundry facility.

In implementations, as described with regard to FIG. 6, each of the plurality of washing and drying robots 4000, 4000a-n further comprises a water inlet 4265 configured to introduce water to the tub 4215 (e.g. the drum 4205 inside the tub) at a temperature in a range of between about 5 to 60 degrees Celsius. In implementations, as shown in FIG. 5, a water treatment system 4048 receives gray water from the tub and is also configured to receive the drained condensed moisture from the heat pump and output sanitized water to an inlet line (e.g., cleaning water conduit 4267) for reuse in the tub 4215 of a washing and drying machine 4000. The water inlet of the at least one washing and drying robot 4000 is configured to receive the sanitized output water for use with a subsequent load of laundry received by the tub.

In implementations, as depicted in the schematic of FIGS. 5 and 7 taken collectively, a heat pump 4045 uses electromechanical work to transfer heat from a source stream at lower temperature to a sink stream at higher temperature. These streams may be air, water, or any other fluid. In implementations, the low temperature source stream comprises the exhaust air carried from one or more of a plurality of washing and drying machines 4000a-n by a conduit 4037a. The process of removing heat from the exhaust air stream reduces its temperature and causes the moisture contained in the exhaust to condense. The resulting moisture content is no greater than the saturation moisture content of the air at the reduced temperature of the exhaust stream. The dehumidification temperature which is set by the design or controls of the heat pump 4045 and may be anywhere between 5 C and 40 C, but preferably between 20 and 35 C and more preferably around 30 C. In implementations, the sink stream is the high temperature stream of air which is introduced to the tub 4215 at the air intake air 4030 for the washing and drying machine 4000. In implementations, the heat source is the exhaust air from the one or more plurality of the washing and drying robots 4000a-n washer-dryers, and the heat sink is the intake air provided at the intakes of the plurality of the washing and drying robots 4000a-n washer-dryers. The heat pump 4045 is designed to balance the cold side and warm side temperatures to optimize the process. Lower condenser temperatures result in reduced moisture content but require more heating to achieve the target intake temperature.

Most commonly, the heat pump 4045 uses electrical energy to drive a compressor 4120, coolant circulation pump, and air blower (not shown) disposed, for example, between the cold side and hot side heat exchangers. In implementations, the heat pump 4045 is configured to capture waste heat from the electromechanical components performing the work, such as compressors, blowers, pumps, etc., in order to further increase the amount of heat energy provided to the sink stream, in this case the intake air for the drying process in the washing and drying robot 4000. In implementations, the system 500 is configured to direct cooled and dehumidified air output from an evaporator 4115 of the heat pump 4045 over the blower and the compressor 4120 prior to routing air through a condenser heat exchanger 4105. In implementations, the at least one heat pump 4045 has a coefficient of performance in a range of between about 1.5 to 8. In implementations, the at least one heat pump 4045 has a coefficient of performance in a range of between about 2 to 3. In implementations, the at least one heat pump 4045 has a coefficient of performance of 2.1. To achieve these ranges and values of coefficient of performance, the at least one heat pump 4045 is at least one of a trans-critical, super critical and sub-critical heat pump. In implementations, the at least one heat pump 4045 comprises a refrigerant, and the refrigerant is at least one of $CO_2$, ammonia, and propane. In implementations, the at least one heat pump 4045 is a trans-critical $CO_2$ heat pump.

In implementations, heat pump compressor 4120 compresses the refrigerant to create a high pressure/high temperature gas. The refrigerant flows through the condenser heat exchanger, where it gives up energy to the cool dehumidified air (e.g., process air) and heating up the air while cooling down the refrigerant and condensing it to a liquid, still at high pressure. The refrigerant liquid passes through an expansion valve, reducing its pressure and cooling it off to below the dew point temperature of the process exhaust air. The liquid refrigerant passes through the heat evaporator 4115, absorbing energy from the humid process exhaust air, cooling it off and condensing the moisture. This evaporates the refrigerant and heats it up. The gaseous refrigerant is compressed by the compressor 4120, restarting the cycle. The temperature of the condenser is typically 5-10 C higher than the desired intake air temperature, and the temperature of the evaporator is typically set to 5-10 C lower than the desired dehumidification temperature. In implementations comprising a trans-critical heat pump, the phase changes described can be implemented with consideration to density and pressure variation and utilizing a gas cooler in place of a condenser. Implementations can include expansion valves, flash tanks, super heaters and other elements for improving performance of the one or more heat pumps 4045.

As described previously with regard to in implementations, as depicted in FIGS. 5 and 6, the system 300 further comprises an intake manifold 4075 configured to accept, via conduit 4047, process air heated by the heat pump 4045 and circulated by the blower 4081 and optionally an auxiliary heater 4082. The intake manifold 4075 distributes the heated process air to the one or more washing and drying machines 4000a-n. The intake manifold 4075 may be connected through electrically controlled dampers 4077a-n to control air flow to one or more air inlets 4030, 4030a-n of the at least one washing and drying machine 4000, 4000a-n of the two or more process lines 100, 100a-n of a cluster 4002. In implementations, the heat pump 4045 is configured to heat the intake air to a temperature that is appropriate for the drying cycle, accounting for any losses in the ducting between the heat pump and the tub 4215 of the washing and drying robot 4000. For example, for a drying cycle operating at 60 C, it may be necessary to set the heat pump to produce an air stream that is 5-10 C higher in temperature (e.g., 65-70 C). The exact temperature loss may depend on duct length, degree of insulation, and/or ambient temperatures, and may be calibrated when the system is installed, periodically during operation, or according to computational models. Under some circumstances, it may be desirable to have the air entering the drum be at lower or higher temperature than the supply air from the heat pump output. For example, the first stage of drying may require a brief period of air that is hotter than average. In implementations, the system 300 additionally or alternatively, can further comprise an auxiliary heater 4082 to heat the process air provided to a cluster 4002 beyond a temperature achieved through the combination of the waste heat and heat from the condenser heat exchanger 4105 of the heat pump 4045. Alternately, an auxiliary heater 4605, for example an electric resistive heater, may be installed in the ducting near the inlet 4030 to the tub 4215 of the individual washing and drying machine 4000a-n.

Auxiliary heat may be needed either periodically in order to accelerate the drying process for particularly challenging loads or continuously to supplement the heat generated by the mechanical operation of the heat pump 4045 based on the target condenser temperature. In the latter case, the auxiliary heater may be installed either at each washing and drying robot 4000, to allow precise operation, or centrally near the heat pump, to reduce complexity and the requirement for high current wiring to each one of the plurality of washing and drying robots 4000. However, an advantage of installing heaters at each washing and drying robot 4000 is that heat losses from the air in the duct are proportional to the temperature difference across the duct wall and are therefore reduced for lower temperature air. Thus it is more energy efficient to heat the air to a moderate temperature produced by balanced heat pump operation, circulate it, and then use the auxiliary heaters to achieve the final temperature, than it is to use the auxiliary heaters prior to circulating the air. For example, the heat generated by the heat pump may be sufficient to heat the air stream to 65 C, creating a 40 C differential across the duct wall to the ambient if it is at 25 C. Then an auxiliary heater may be used to bring the temperature up to 75 C at the tub. This arrangement would have approximately 20% lower losses than using an auxiliary heater to bring the temperature up to 75 C prior to circulating it through the ducts. A further advantage is that heaters at each machine allow for independent control of the temperature for each washing and drying robot and at different times in the cycle.

If an intake air at temperature below that produced by the heat pump is desired, for instance at the end of the cycle to minimize damage to the fabric and/or wrinkles in the fabric, a heat exchanger may be installed in the incoming air stream. The heat exchanger may be cooled with incoming process water, for example water entering from the municipal water supply for use in the wash cycles of each of the plurality of washing and drying robots 4000a-n in a cluster 2002. The temperature of the municipal water supply is typically between 5 and 10 C and far below any temperatures of air used in the drying process. Alternately, the system may be configured to introduce fresh air through the fresh air manifold 4076 mixed at any desired proportion with the heated process air in order to achieve the target intake temperature.

In implementations, as depicted in the schematic of FIGS. 5-7 taken collectively, the at least one heat pump 4045 is further configured to comprise a heat exchanger 4105 cooled by incoming process water. Said heat exchanger further cools the exhaust air, reducing its humidity, and at the same time heats incoming process water 4110 provided to the system. Additionally or alternatively, the compressor 4120 and blower comprise water cooling ducts or fins, and incoming process water 4110 flows through the ducts or fins to cool the blower and compressor 4120.

Additionally or alternatively, at least a portion of the heat output of the heat pump 4045 can be optionally utilized for heating the process water 4112 to be introduced to a tub 4215 of the same or another robot of the at least one of the plurality of washing and drying robots 4000a-n during a wash cycle, for example by routing some of the air via the exhaust manifold 4040 or by piping process water through a heat exchanger 4105 in contact with the compressor 4120 and/or blower. In implementations, the water heated by the portion of waste heat can be stored in an insulated holding tank (not shown) for later use by at least one of a plurality of washing and drying robots 4000, 4000a-n. In implementations, a portion of the waste heat can be introduced to the process water 4112 introduced to a tub 4215 during a final rinse cycle. Operating a final rinse cycle in hot water (e.g. water in a range of between about 20 to 40 degrees Celsius) heats up the load of already-washed deformable laundry articles and/or the metal drum 4205 and tub 4215 of a washing and drying robot 4000 and thereby shortens the subsequent drying cycle time by at least 5 and by between about 10-20 minutes off of a dry cycle averaging between about 80 to 100 minutes.

As previously described, in implementations, hot air (waste heat) from the heat pump evaporator 4115 (e.g., condenser), is conveyed through the conduit 4047 to the intake manifold 4075. The intake manifold 4075 serves a plurality of washing and drying robots 4000a-n. Referring back to FIG. 5, at each of the plurality of washing and drying robots 4000a-n, a valve or damper 4077a-n in the manifold controls the air flow to that robot and opens when the robot is ready for drying. In implementations, the valve 4077a-n can be at least one of a butterfly valve and a gate valve. Optionally, the system may incorporate an outside air intake through a fresh air manifold 4076, and the dampers 4077a-n of the manifold 4075 may be configured to control the mixing of high temperature air from the heat pump with cooler outside air to achieve the target temperature for each washing and drying robot, as discussed subsequently with regard to implementations.

Within the tub 4215 and drum 4205, several thermodynamic processes are in balance: the heated air heats the plurality of laundry articles and cools off, water evaporates from the plurality of laundry articles and cools the air and the clothing, and lint is given off by the mechanical motion. In implementations, one or more of the air path, perforations in the drum, the volume and speed of the air flow, the baffles in the drum, and the speed and direction of tumbling are configured so as to optimize one or more parameters such as damage to clothing, cycle time, capacity of the heat pump, and energy use. In implementations, load balancing the energy usage in the system 300 to prevent losses and maximize efficiencies comprises at least one of predictive load balancing within one or more clusters 4002 based on load characteristic and actively adjusting process controls. Efficiencies gained on implementations described herein with regard to a closed loop system 300 can be further understood by a comparison of representative closed loop data analysis and open loop data, as will be described subsequently with regard to implementations.

In an open loop system not utilizing a heat pump, a stand alone tumble dryer (e.g., a consumer dryer or a single washing and drying robot 4000 operating in a drying portion of a washing and drying sequence) draws air in (via a fan) to a drum of the dryer from the ambient environment (either the space surrounding the dryer or piped in from another indoor or outdoor location). The air is heated prior to entering the drum, using an electrical resistance heater, a gas burner, or other means. It then passes through a rotating drum which rotates to tumble the load of damp fabric items. The tumbling action and temperature and velocity of the air flow drive the thermodynamics of the drying process. Through this process, the temperature of the air drops and moisture content of the process air increases. The process air then exits the drum through the exhaust port. Typically, the exhaust ducting is fitted with a lint filter followed by a fan that drives the air flow and is exhausted either back into the room or vented into a different space, for example outdoors. All of the energy consumed by the heater and the fan, therefore, is eventually discarded to the ambient in the form of warm moist air.

In the open loop process the temperature of the air entering the drying drum intake depends on the temperature and moisture content of the ambient source air, the flow rate, and the heater power, while its absolute moisture content depends on the humidity of the ambient air from which the air stream is drawn. The moisture content and temperature of the exhaust air depends on the properties (temperature, moisture content, flow rate) of the air entering the drum intake air as well as the thermodynamics of the drying process. The air flow volume depends on the fan power, on the mechanical resistance created by the fixed elements such as ducting, heater, lint filter, etc. The air flow volume also depends on variable elements such as the amount and fabric type(s) of clothing in the drum and lint deposits in the filter, which act as resistance to air flow. The rate of the drying process may be controlled by controlling the heater power or by controlling the fan power, or both. For example, the heater power may be cycled with simple on/off feedback loop controls to keep the air temperature in a desired range.

Figure 8:
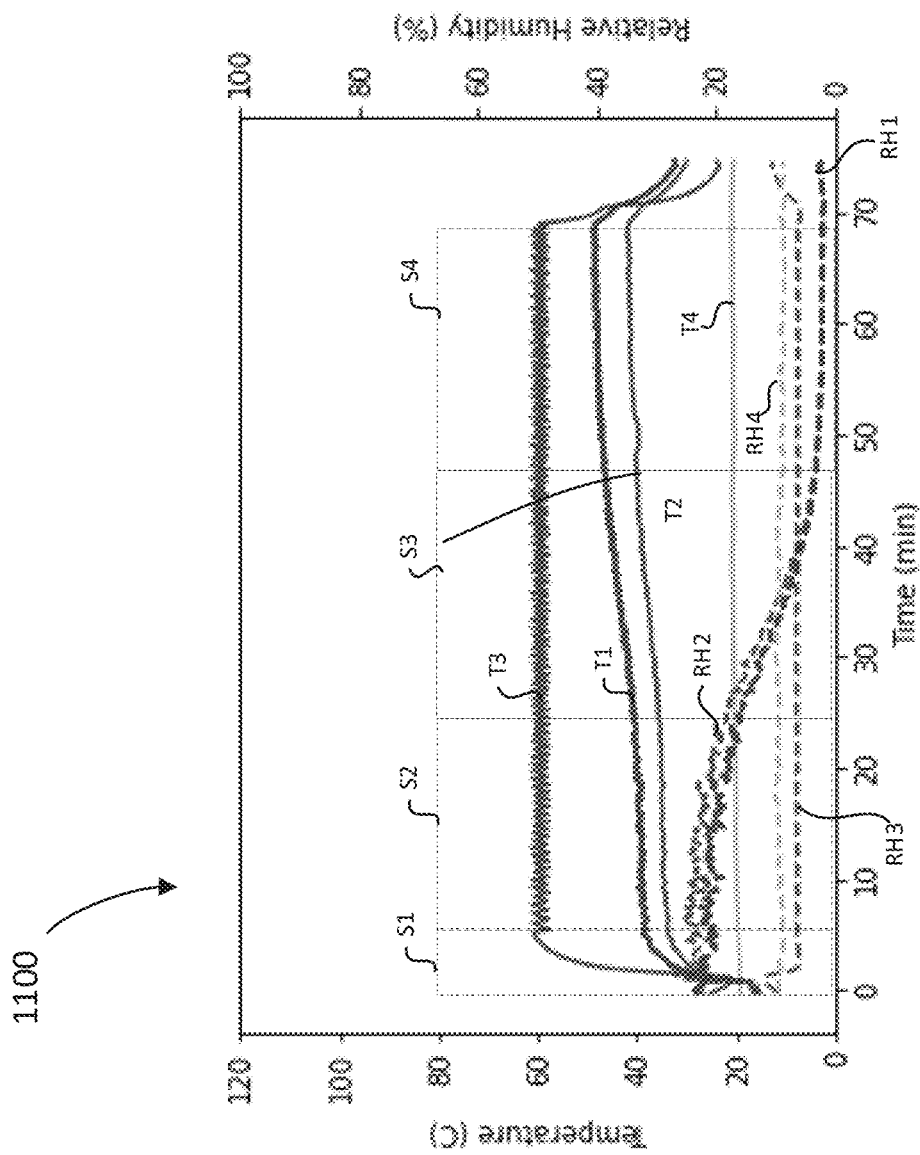
FIG. 8 depicts an example plot of measured sensor data for a system including a washing and drying robot.
Figure 9:
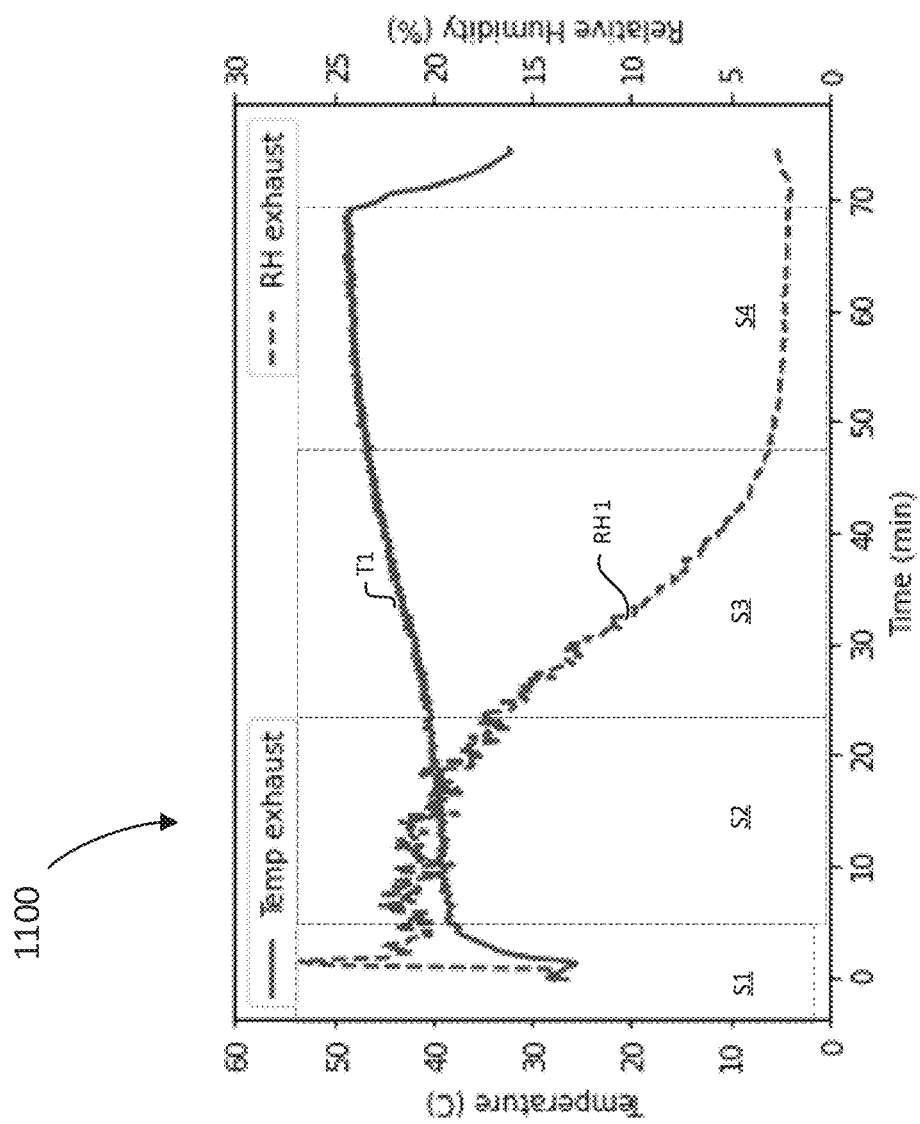
FIG. 9 depicts portions of the example plot of FIG. 8 showing exhaust air temperature and relative humidity over time during a drying cycle of an autonomous washing and drying device.
Figure 10:
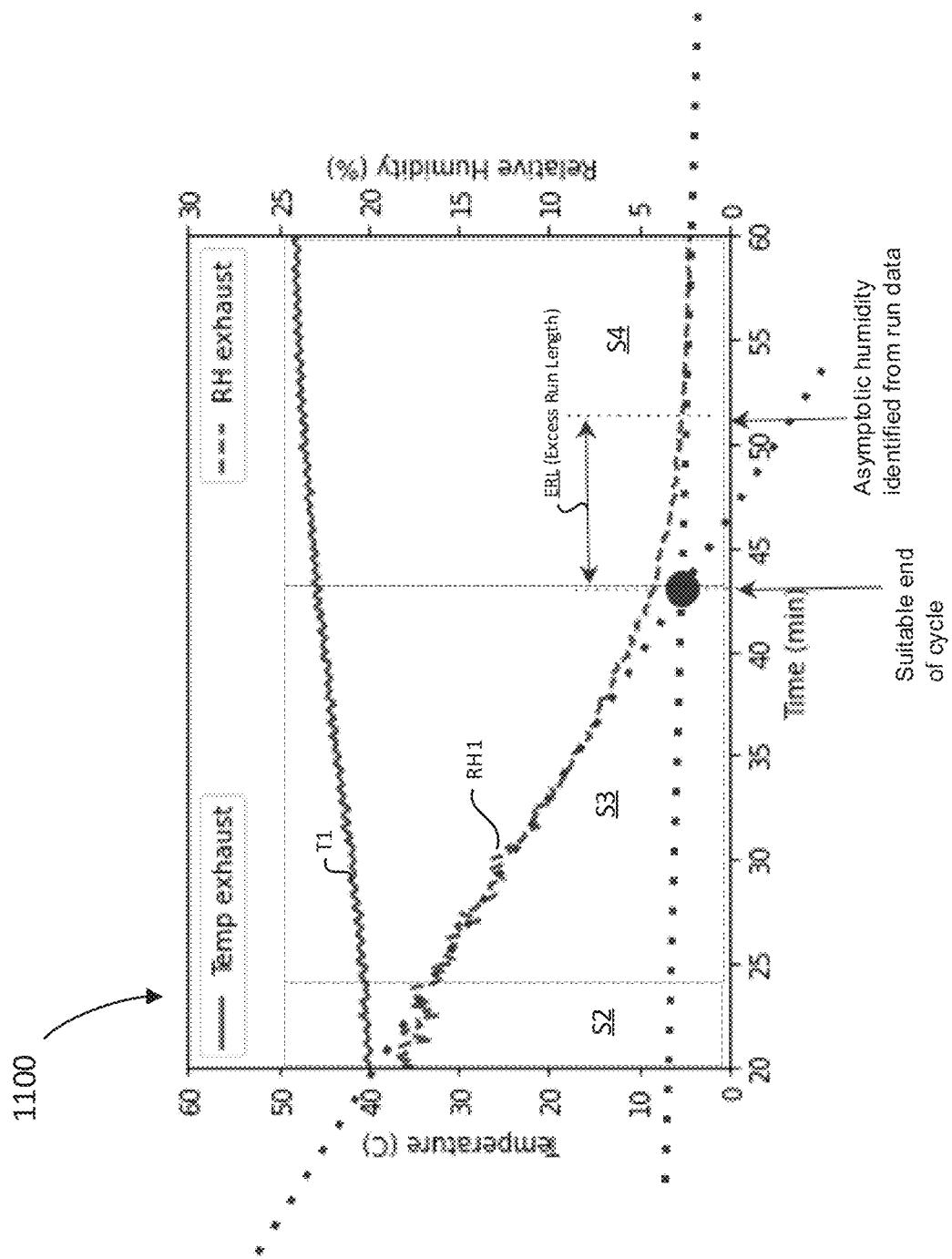
FIG. 10 depicts an enlarged portion of the plot of FIG. 9.

FIG. 8 depicts a plot of measured temperature and humidity sensor process parameters for a representative open loop drying cycle for a combination washer and dryer machine, such as the washing and drying robot 4000 of FIG. 6. Four temperature (T1-T4) and humidity (RH1-RH4) sensors are located (1) at the exhaust duct 4325 near the port 4300, (2) at the lint trap 4608, (3) just prior to the air flow entrance port 4030 to the tub 4215, and (4) external to the tub 4215, monitoring the ambient conditions. FIGS. 9 and 10 depict portions of the plot 1100 of FIG. 8. As depicted in FIG. 9, drying proceeds in several stages over time as indicated by the temperature and relative humidity values measured over time at the exhaust duct 4325. The initial temperatures of the tub 4215 and the load of laundry articles are determined by at least one of the ambient temperature and humidity conditions, the prior processing step (e.g., the temperature of the final rinse water), and heat loss to the ambient air. During a first stage S1, the temperature T1 of the exhaust slowly rises as the intake air heats the drum 4205 of the washing and drying machine 4000 and fabric items disposed therein. In the second stage S2, the temperature T1 and humidity H1 of the exhaust air are roughly constant, with the values depending on the load size (e.g., small, medium, and large), the temperature, humidity, and flow rate of the intake air and the thermodynamics of the drying process.

This second stage S2 lasts while the fabric(s) of the laundry articles in the drum 4205 are damp enough that the fabric surfaces are always saturated. The thermodynamic driver is thus the evaporation of free moisture from the surface. During the third stage S3, not enough moisture remains in the fabrics of the articles in the drum 4215 to keep the fabric surfaces saturated. The thermodynamic processes are dominated by the rate of the migration of moisture trapped within the fabric to the surface of the fabric, where evaporation occurs. The third stage S3 is characterized by a slow, roughly linear decline RH1 in exhaust humidity and a slow, roughly linear increase in exhaust temperature T1. During the fourth stage, S4, the fabric is dry and the temperature and humidity of the exhaust air asymptotically approach the temperature and humidity of the intake air, limited by losses to the ambient through the walls of the drum 4205 and tub 4215 and other structures attached to the washing and drying robot 4000.

In an open loop system, the temperature of the intake air may be maintained by controlling the heater power (e.g., power of a resistive heater) and/or air flow rate, but the moisture content is determined by the ambient conditions and may vary due to weather or seasonal or daily variations in building HVAC settings. Thus, the derivative of temperature or humidity with respect to time is a more reliable indicator of the stage of the drying process. As illustrated in FIG. 10, the third stage S3 ends when both the humidity RH1 and temperature T1 start to level off. This creates a challenge in implementing process control algorithms because this requires trying to determine when the third stage S3 has leveled off to an "end" point that might continually shift based on changes in ambient conditions. So the drying process would need to run long enough to reliably establish the leveling off of the parameters. In contrast, relying on the instantaneous values of the exhaust thermal properties may lead to insufficiently dry loads of laundry or to excessively long process durations.

Returning now to a closed loop system such as that of FIGS. 5-7, the same drying stages S1-S4 occur in a closed loop system as in an open loop system, but the closed loop system allows for better control of process parameters. In a closed loop system, the process air moisture content is set by the condenser temperature of the heat pump 4045, which creates repeatable process conditions. Thus, a controller 4005 can monitor detected temperature, humidity, and airflow parameters for setpoints known in advance (e.g., a preprogrammed time dependent sequence of ranges of values for at least one of air temperature, air flow, and air humidity). In implementations, the closed loop system comprising a heat pump 4045 allows a more accurate determination of drying cycle completion and, in some instances, the drying process is shortened by 5-10 minutes per load of laundry dried.

In implementations, as depicted in the plot 1100 of FIG. 9, in a drying cycle for which the intake air is at a temperature at 60 C, the exhaust temperature T1 (Celsius, plot y-axis) during the process may range from 35 to 45 C over time (minutes, plot x-axis), and only exceed 45 C once the load of wet laundry in the drum 4205 is adequately dry. Thus the controller 4005, 4005a-n in operable communication with a heat control unit (e.g., intake manifold 4075) of a washing and drying robot 4000 may stop the process (e.g., close the dampers 4077a-n) as soon as the exhaust temperature T1 measurement exceeds 45 C. Additionally or alternately, as depicted in FIG. 10, in implementations, the controller 4005, 4005a-m can be configured to detect that a load of laundry in the drum of the washing and drying robot 4000, 4000a-n is adequately dry and stage 3 S3 is completed when the exhaust humidity RH1 measurement falls below 10%, and the process may be stopped once humidity below 10% is detected. The values of the threshold temperature (for example 45 C) and threshold humidity (for example 10%) depend on the moisture content of the intake process air and can therefore be reliably established for a closed loop cycle but not for an open loop cycle.

The thresholds for process completion will depend on at least one of the temperature and moisture content of the intake air, the air flow rate through the drum 4205 of the washing and drying robot 4000, 4000a-n, and on heat losses to the ambient. Additionally or alternatively, acceptable dryness of the load of laundry may depend on packing requirements and storage conditions of the autonomous packing robot 8000 and autonomous storage and distribution system 9000. In implementations, the controller 4005 of a washing and drying robot 4000, 4000a-n is configured to adjust one or more of the at least one of the temperature of the intake air, the moisture content of the intake air, and the air flow rate through the drum of the washing and drying robot 4000, 4000a-n within ranges of preprogrammed values to meet pre-set requirements of the autonomous packing robot 8000 and autonomous storage and distribution system 9000.

Furthermore, as discussed above, a closed loop cycle offers an opportunity for implementing a heat pump for heating the intake air stream using energy reclaimed from the exhaust air stream. However, introducing a heat pump to a single tumble dryer in a closed loop air cycle would introduce inefficiencies due to energy intensive transient states at start up and shut down of the heat pump, as well as idle time while the washing and drying robot 4000 was not in a drying cycle. In implementations of the present invention, a single autonomous washing and drying robot 4000 both washes and dries a load of laundry therein, and during the wash cycle, hot air is not required.

Figure 11:
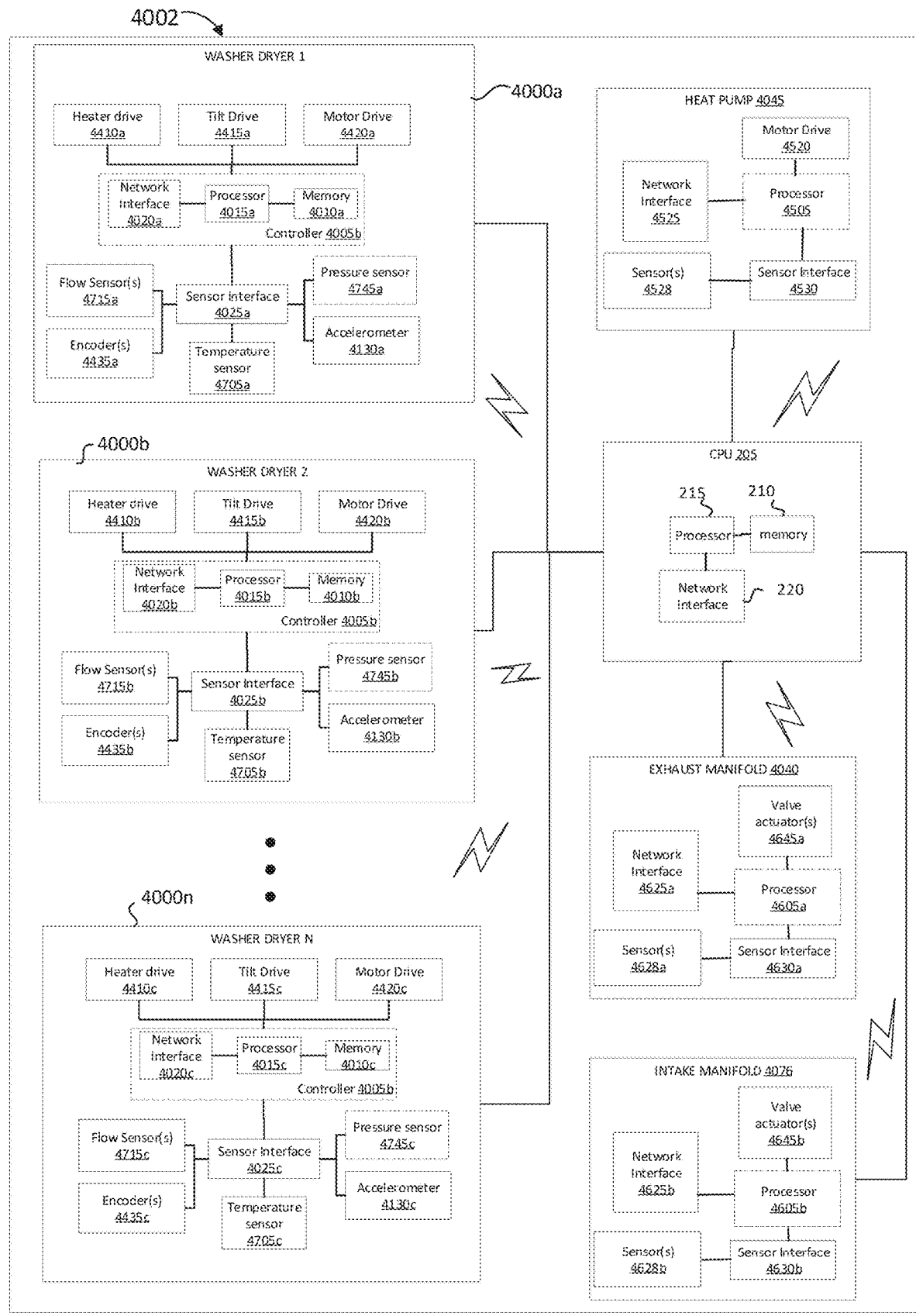
FIG. 11 depicts a schematic implementation of a system including a single washing and drying robot cluster.

In implementations, therefore, as shown in FIG. 11, a single heat pump 4045 is configured to serve a plurality of washing and drying robots 4000, 4000a-n. A cluster 4002 comprises at least one controller (e.g., controller 4005, CPU 205) in wired or wireless communication via a communication network (e.g., network 230) with the plurality of washing and drying robots 4000a-n, a heat pump 4045, an exhaust manifold 4040 configured to combine hot, humid process air exhausted from one or more of the washing and drying robots 4000a-n and route the combined exhaust air to the heat pump 4045, and an intake manifold 4076 configured to route dry, heated air from the heat pump 4045 to the plurality of washing and drying robots 4000a-n.

Each washing and drying robot 4000a-n in the cluster 4002 is in operable communication with at least one of their respective processors 4015a-n and the at least one controller (e.g., controller 4005, CPU 205) via a wired or wireless network (e.g., network 230). In implementations, each one of the plurality of washing and drying robots 4000a-n comprises a heater drive 4410, a tilt drive 4415, and a motor drive 4420 configured to operate an air heater, a tilt motor for tipping the drum from a vertical laundry loading position to a substantially horizontal washing and drying cycle position to an inverted clean laundry dumping position. Each one of the plurality of washing and drying robots 4000a-n comprises a network interface 4020a-n configured to communicate data and sensor signals to at least one of the respective processors 4015a-n and the at least one controller 4005a-n, 205 of the cluster 4002 (via a wireless or wired communication network 230) for processing. The sensor signals comprise output signals from at least one of one or more air flow sensors 4715a-n, 4720a-n, one or more temperature sensors 4705a-n, 4710a-n, 4725a-n, 4730a-n, one or more pressure sensors 4745a-n, one or more encoders 4435a-n, and one or more accelerometers 4310a-n. The sensor signals are routed to the at least one of the respective processors 4015a-n and the at least one controller 4005a-n, 205 of the cluster 4002 via the sensor interface 4025a-n of each one of the plurality of washing and drying robots 4000a-n.

The exhaust manifold 4040 in the cluster 4002 comprises a processor in operable communication with the at least one controller (e.g., controller 4005, CPU 205) of the cluster 4002 via a wired or wireless network (e.g., network 230). In implementations, the manifold 4040 comprises one or more valve actuators 4645 in operable communication with the at least one controller (e.g., controller 4005a-n, CPU 205) for controlling the movable airflow dampers 4076a-b. In implementations the manifold 4040 further comprises a sensor interface 4630a configured to receive one or more output signals from one or more sensors 4628a (e.g., airflow, temperature, humidity and pressure sensors) disposed on or in the manifold 4040 to the processor 4605a for processing and/or routing to the at least one controller (e.g., controller 4005a-n, CPU 205) via the network interface 4625a in communication with the at least one controller via the wired or wireless network 230.

The cluster 4002 configuration prevents the heat pump 4045 from experiencing inefficiencies associated with having to startup and shutdown intermittently because at any point in time, one or more of the washing and drying robots 4000, 4000a-n in a cluster 4002 is operably engaged with the heat pump 4045. For example, when starting up, the heat pump 4045 must initially cool the cold side refrigerant loop and heat the warm side refrigerant loop. The duration of this period may be 3-10 minutes. Conversely, at shutdown, the cold refrigerant is cold and the hot refrigerant is hot. This temperature separation, and therefore potential work, would not be utilized if applied to a single machine because the enthalpy difference would dissipate by the time the combination washing and drying starts the next drying cycle.

In contrast, in a cluster 4002, 4002a-n of autonomous washing and drying robots 4000, 4000a-n receiving process air via the intake manifold 4075 and exhaust manifolds 4040, the cycle start time and duration may be staggered by at least one of a controller 4005a-n and CPU 205 in communication with each of the washing and drying robots 4000a-n in a cluster 4002. Furthermore, the size of the heat pump 4045 required to service a cluster of a total number "n" of autonomous washing and drying robots 4000 is significantly less than "n" times the size of the heat pump 4045 required to serve a single washing and drying robot 4000. For example, if a single autonomous washing and drying robot 4000 requires a 6 kW heat pump, 100 washer dryers will require less than 600 kW of heat pump capacity. In implementations, depending on the relative proportion of drying time to cycle time, the heat pump 4045 may need 450 kW of capacity or possibly as little as 300 kW. Furthermore, larger heat pumps are more efficient in both operating energy and initial installation cost than smaller heat pumps, resulting in a cost savings in a range of between about 50% to 75% compared to individually paired heat pumps. As will be subsequently described with regard to implementations, by staggering cycles between washing and drying robots 400a-n in a cluster 4002 and/or across two or more clusters 4002a-n, the load on a heat pump 4045 dedicated to a cluster 4002 can be balanced, avoiding losses associated with starting up and shutting down and resulting in efficiencies in both capital equipment and operating costs.

Additionally or alternatively, based on one or more output signals of a plurality of sensors (e.g., airflow, temp, and humidity sensors 4705, 4710, 4715, 4720, 4725, 4730, 4060 of FIG. 5 and FIG. 6) the controller 4005 or a GPU 205 in communication with the cluster of washing and drying robots 4002a-n can pre-determine at least one of the temperature of the intake air, the moisture content of the intake air, and the air flow rate through the drum 4215 so as to minimize the drying time, minimize the total energy consumed, and/or to minimize damage to the fiber items of a load of laundry articles. To enable determining at least one of the pre-programmed values, one or more characteristics of the load of laundry articles can be provided by a preceding robot (e.g., automated intake robot 2000 and/or separating and sorting robot 3000) in communication with at least one of the controller 4005 and GPU 205 over the communication network 230. The one or more characteristics can include at least one of load size, fabric type, fabric finishes, wash cycle temperature, and article type (e.g., thick, water retaining items such as towels and jeans and thinner fabric items such as t-shirts and underwear). In implementations, a small load size comprises a weight up to about 3 kg, a medium size load comprises a weight in a range of between about 3-5 kg, and a large size load comprises a weight in a range of between about 5-10 kg.

In implementations, faster drying time is associated with high air flow rates and higher temperature, for example, airflow rates between 400 and 1000 m3/hr and temperatures in a range of between about 70 C and 90 C for a drum 4215 comprising a volume 0.2 m3 (cubic meters). Energy conservation is associated with high air flow rates and lower temperatures, for example, airflow rates between 400 and 1000 m3/hr (cubic meters per hour) and temperatures in a range of between about 45 C and 60 C. Minimizing damage to fibers and fabric finishes such as printing, embossing, embellishments, elastic, or other elements of fabric items requires balancing the tradeoff between lower temperatures and shorter drying times. While high temperatures are known to contribute to damaging fiber items, for example by promoting shrinking and matting, longer tumbling times may also cause damage through rubbing or removal of material in the form of lint. In implementations, therefore, at least one of the controller 4005 and GPU 205 determines optimum conditions based on two or more of the following load characteristics: the size of the load of laundry relative to a size of a drum of a washing and drying robot 4000a-n, the fiber composition and fabric type (e.g., weave/knit type and looseness, length of fibers (staple) from which the fiber/yarn is spun, spin quality of the fiber/yarn, fuzziness, etc.) of one or more articles in the load, fabric finishes of one or more articles in the load, wash cycle temperature, and article type and thickness.

Additionally or alternatively, in implementations, at least one of the controller 4005 and GPU 205 makes a determination to reduce a total estimated duration of the drying cycle by selecting moderate or high temperatures for some or all of the cycle, for example moderate temperatures in a range of between about 45 C to 55 and high temperatures in a range of between about 65 to 85 C.

For example, as shown in FIG. 9, during the first stage S1 of drying as described above, the function of the hot air is primarily to heat the equipment (e.g., tub 4215 and drum 4205) and fabric of the load of laundry to the steady state process temperature. Very little drying occurs during this stage and it may be desirable, from a laundry facility operating point of view, to accelerate the first stage S1 as much as possible. Any potential heat damage to the fabric would not occur during this first stage S1, because this first stage S1 only lasts as long as the fabric of the laundry is heating up to the target process temperature for drying. This first stage S1 may be accelerated by heating the intake air to a higher temperature, as much as 85 C. This temperature must also take into account the temperature limit of bearing seals, gaskets, and any other components of the washing and drying robot 4000. Alternately, the temperature of the components of the washing and drying robot 4000 and the load of laundry may be increased by increasing the temperature of the final rinse in the wash cycle, or through the use of alternative heaters such as resistive heaters or infrared heat lamps in the walls of at least one of the tub 4215 and drum 4205.

In the second stage S2, the exhaust temperature and humidity are roughly constant, varying by no more than 10%. During this stage, the fabric items are still damp and the rate of moisture loss is dominated by the evaporation of free surface moisture. In this case, higher air temperatures and higher turbulence of the air in the drum 4205 both accelerate the drying process. During this stage the fabric temperature will generally not exceed the wet bulb temperature of the process air in the drum 4205, which is far lower than the intake temperature. Thus the intake temperature may be chosen to be between 60 and 80 C to accelerate the process. However, running at a higher temperature results in reduced energy efficiency. So if energy efficiency concerns dominate, the intake temperature can be chosen to be between 40 and 60 C.

In the third stage S3, the exhaust humidity RH1 gradually falls and the exhaust temperature T1 gradually rises. During this stage, the drying process is limited by the migration of moisture trapped in the fabric toward the fabric surface. Thus the humidity at the surface may be far lower than the saturation humidity of the process air, and the surface temperature may exceed the wet bulb temperature of the process air. To avoid damaging the fabric of the laundry in the drum 4205 through overheating, the intake process air temperature may be reduced, either as soon as the third stage S3 is detected by sensor signals output to the controller or gradually as the stage S3 progresses (e.g., as fabric temperature increases). For example, the intake temperature may be adjusted so that the exhaust temperature remains constant. Specifically, for example, if during the second stage S2 the intake temperature was 60 C and the exhaust temperature was 45 C, then during the third stage S3 the controller 4005 or CPU 205 can instruct one or more of the intake manifold 4075 and fresh air manifold 4076 to reduce the intake temperature to the drum 4205 in small steps of a few degrees (2-5 degrees C.) whenever the exhaust temperature rises above 45 C to maintain the exhaust temperature at around 45 C. Alternately, the intake temperature may be reduced to 45 C at the start of the stage S3.

The fourth stage S4 occurs when the fabric is completely dry, in which case the temperature inside the drum 4205 and the temperature of the fabric continue to increase to the limit of the intake temperature, less any losses to the ambient environment. However, no additional drying is taking place. During this fourth stage S4, the controller 4005 or CPU 205 can instruct one or more of the intake manifold 4075 and fresh air manifold 4076 to reduce the intake temperature to the drum 4205 to allow the fabric of the laundry articles in the drum 4205 to cool. In implementations, the controller 4005 or CPU 205 continues calling for air flow through the drum 4205 and tumbling the drum 4205 until the load of laundry can be removed, thereby reducing or avoiding the creation of any fabric wrinkles.

In implementations, in a laundry facility that is not operating at full capacity or at times and locations where energy is expensive, it may be desirable to set the drying process (e.g., drying cycle) for an intake temperature of 45

C for high energy efficiency. In other circumstances or locations, for example where demand is high or local energy costs are low, it may be desirable to set the drying temperature to 80 C for rapid cycles. If minimizing fabric damage (e.g. for delicate wool knits, based on fabric characteristics detected by the sorting and separating robot 3000, for example) is the most critical condition, the controller 4005 or CPU 205 is configured to run the drying cycle (e.g., stages S2 and S3) at very low temperatures, for example 35 C. For fabrics that are damaged by long tumbling time, the process may be set to 60 C initially and until approximately 50% of the moisture is removed, and then the temperature lowered to 35 C. The controller 4005 and/or CPU 205 can store in memory one or more threshold conditions for triggering these temperature control settings. For example, if only 50% of a cluster 4002 is operating, the intake temperature can be set to 45 C and if 50-100% of the cluster 4002 is in use, the intake temperature can be set to 80 C.

As described with regard to the implementations of FIGS. 8-11, a closed loop system 300 with a heat pump 4045 achieves efficiencies across a cluster 4002 comprising a plurality of washing and drying robots 4000*a-n*. In implementations a cluster 4002 of washing and drying robots 4000*a-n* comprises a range of between about 3-120 washing and drying robots 4000. In implementations a cluster 4002 of washing and drying robots 4000*a-n* comprises a range of between about 6-24 washing and drying robots 4000. In implementations, the plurality of washing and drying robots 4000*a-n* comprises at least three washing and drying robots. In implementations, the plurality of washing and drying robots 4000*a-n* comprises at least six washing and drying robots. As shown in FIG. 9, in implementations, the plurality of washing and drying robots 4000*a-n* of a cluster 4002 comprise at least 12 washing and drying robots 4000. In implementations, the at least 12 washing and drying robots 4000 are identical and run the same 1.5 hour cycle but with staggered start times, collectively providing a uniform load on the heat pump 4045.

Figure 12:
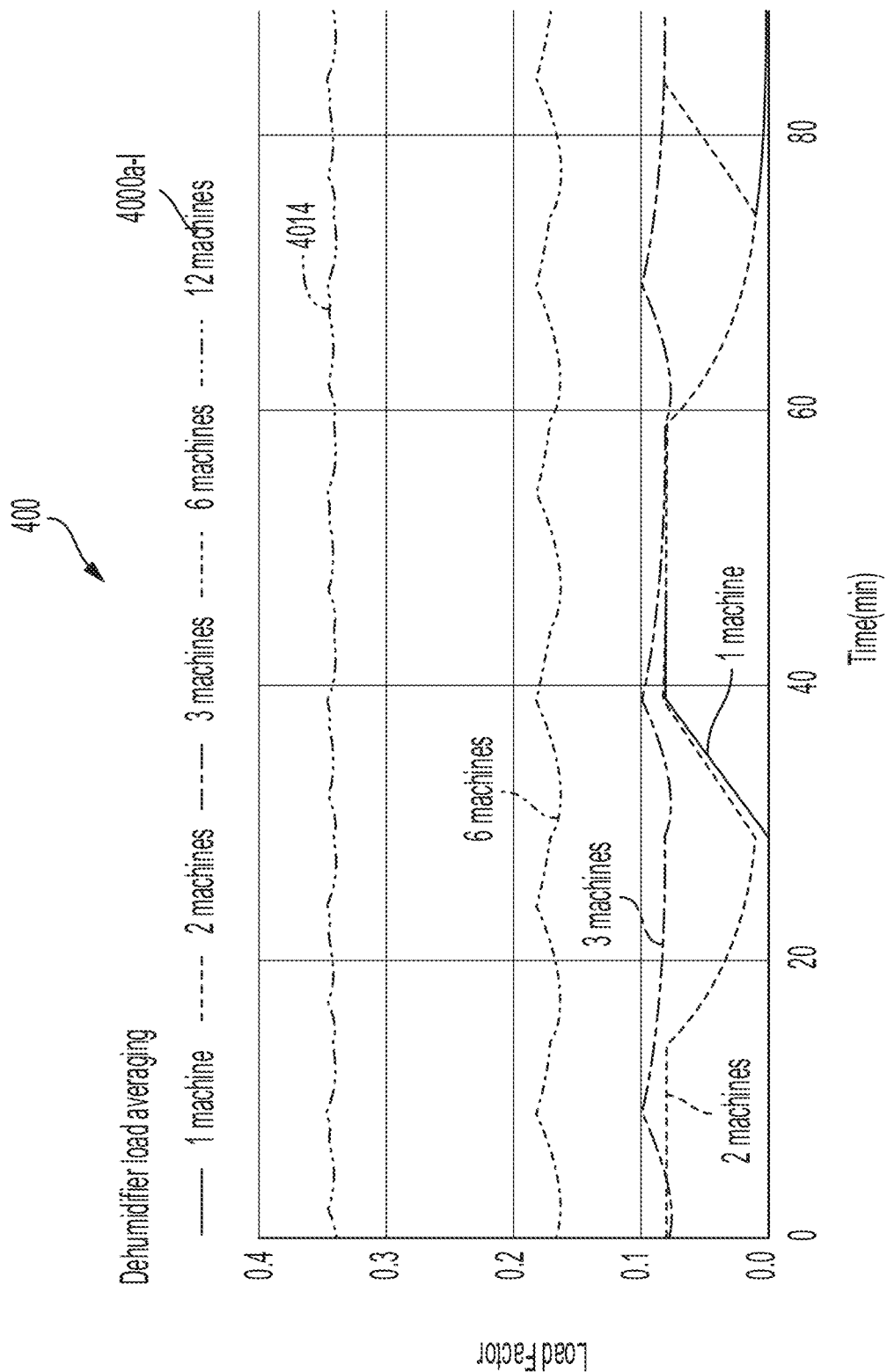
FIG. 12 depicts a schematic example diagram depicting load averaging on a heat pump in accordance with the examples of FIGS. 5 and 7.

In implementations, as shown in the FIG. 12 the at least twelve washing and drying robots 4000*a-l* can accommodate more efficient load balancing, as indicated by the substantially linear load average 4014 across an average drying cycle time for a plurality of washing and drying robots 4000*a-n*. For example, a load of laundry comprises a plurality of dirty laundry articles and the plurality of dirty laundry articles comprise household laundry, including garments of different types, sizes (e.g., article sizes having a longest dimension in a range of between about 4 cm to 400 cm), materials, and thicknesses, and non garment articles such as sheets, towels, table cloths, curtains and myriad other deformable laundry articles found in households. In implementations, as the number of washing and drying robots 4000*a-n* in a cluster 4002 increases, the averaging of the large number of loads compensates for variation in load process time, temperature, and air flow requirements to keep the total load on the heat pump 4045 within efficient usage parameters, avoiding transient losses associated with needing to start up and shut down. As indicated in FIG. 12, the load factor for 12 machines in a cluster is at around 0.35, which is not twelve times a peak load for a single machine, which is at around 0.08. The load on the heat pump 4045 per machine therefore improves significantly in a cluster of 12 or more washing and drying robots 4000*a-n* as long as the load timing between the plurality of washing and drying robots 4000*a-n* in the cluster 4002 is adequately asynchronous. This allows the cluster 4002 to be served with a much smaller heat pump than would otherwise be required, as will be described subsequently in detail with regard to implementations.

As indicated in FIG. 1, a process line 100, 100*a-c* includes a dirty laundry separating and sorting robot 3000 configured to batch the plurality of dirty laundry articles into one or more loads prior to automatically feeding one or more tubs of the plurality of washing and drying robots 4000, 4000*a-n*. At least one of the controller 4005*a-n* and CPU 205 is configured to load balance across the plurality of washing and drying robots 4000, 4000*a-n* by intelligently selecting for each load of laundry a particular washing and drying robot 4000 of the plurality of washing and drying robots 4000, 4000*a-n* for receiving a particular load. This load balancing can consider a number of variables for optimizing process load and input to the one or more heat pumps 4045. The variables can include at least one of determining availability of a washing and drying robot 4000, analyzing expected tub and/or drum temperature of a just-used washing and drying robot 4000 for pairing with load type considerations (e.g., one or more load characteristics), and timing for spacing out over time the temperature and humidity loads across the process line.

For example, the algorithm executed by at least one of the controller 4005*a-n* and CPU 205 may be programmed to divide loads consisting of items which tend retain a high percentage of moisture relative to their weight, for example towels or sweatshirts, into smaller sub-loads to be processed by two or more of the plurality of washing and drying robots 4000*a-n* thereby ensuring that a process time for each sub-load is close to an average process time of an average load. In a specific example, if a customer load of laundry consists of 10 lbs of mixed clothing and 10 lbs of towels, the algorithm may be programmed to allocate 10 lbs of clothing to one washing and drying robot and 5 lbs each of towels to each of two additional ones of the plurality of washing and drying robots 4000*a-n* so that the process time of all three loads are comparable and the customer's clean laundry contemporaneously exits the to the clean laundry separating robot 5000. In another example, items which cannot tolerate high temperature drying air, for example items made of wool (as identified by a preceding robot, e.g., the sorting and separating robot 3000), may be subdivided into smaller loads so that the duration of the drying process at the lower temperature is comparable to the duration of other loads belonging to the same customer which are processed at higher, standard drying temperatures. In another example, items made of synthetic fibers for which the residual moisture after the spin cycle is unusually low may be processed in larger loads so that their processing time matches the processing time of the customer's average load.

The algorithm executed on at least one of the controller 4005*a-n* and CPU 205 is programmed to particularly determine processing conditions for laundry articles that are difficult to dry for other reasons. These determined process conditions comprise processing the identified laundry articles at lower or higher temperatures and/or in smaller loads. For example, items which are very thick, such as insulated coats or blankets identified as such by a preceding robot (e.g., separating and sorting robot 3000) in the process line 100, take a long time to dry because the moisture trapped within the insulation must migrate a long distance to the surface of the item. Such items also can be stiff and block the air flow within the drum 4205, further slowing the drying process. Similarly, items which are very large, such as large sized sheets and blankets, can block flow of air within the drum. Thus, in implementations, the algorithm executed on at least one of the controller 4005*a-n* and CPU 205 can be programmed to run such items in smaller loads or at higher temperatures. However, because of the reduced air flow, the surface temperature of the laundry articles can be higher than the average observed for the given air flow and heat pump settings. In implementations, the algorithm executed on at least one of the controller 4005*a-n* and CPU 205 is programmed to particularly determine process conditions for laundry articles that are prone to damage, and instruct the one or more washing and drying robots 4000*a-n* to reduce the drying temperatures by at least one of turning off the optional auxiliary heater 4605, increasing the proportion of fresh air from the freshers air manifold 4076, and adjusting at least one of the intake manifold 4075 dampers 4076*a-n* and fresh air manifold 4076 dampers 4078*a-n*.

In implementations, the CPU 205 is configured to determine at least one of airflow, temp, and cycle duration for the particular characteristics of a load of laundry, wherein the particular characteristics are detected at and communicated by prior robot (e.g., a separating and sorting robot 3000) in the process line 100. In implementations, the load characteristics comprise at least one of the following: the size of the load of laundry relative to a size of a drum of a washing and drying robot 4000*a-n*, the fiber composition of one or more articles in the load of laundry, fabric finishes of one or more articles in the load of laundry, wash cycle temperature for the load of laundry, and at least one of article type and thickness. The CPU 205 therefore can calculate an estimated drying time duration based on the one or more load characteristics. Additionally or alternatively, over time, as the plurality of washing and drying robots 4000*a-n* process loads of laundry, a memory, such as a memory 210 of the CPU 205 or a remote server in wired or wireless communication with the CPU 205 via a communication network 230, can store in a database cross reference data for cycle duration, temperatures, and airflow volumes and rates for various load characteristics at the completion of drying. The CPU 205 can estimate drying time for a load of laundry based on a comparison of load characteristics with data stored in the database of completed loads.

Figure 13:
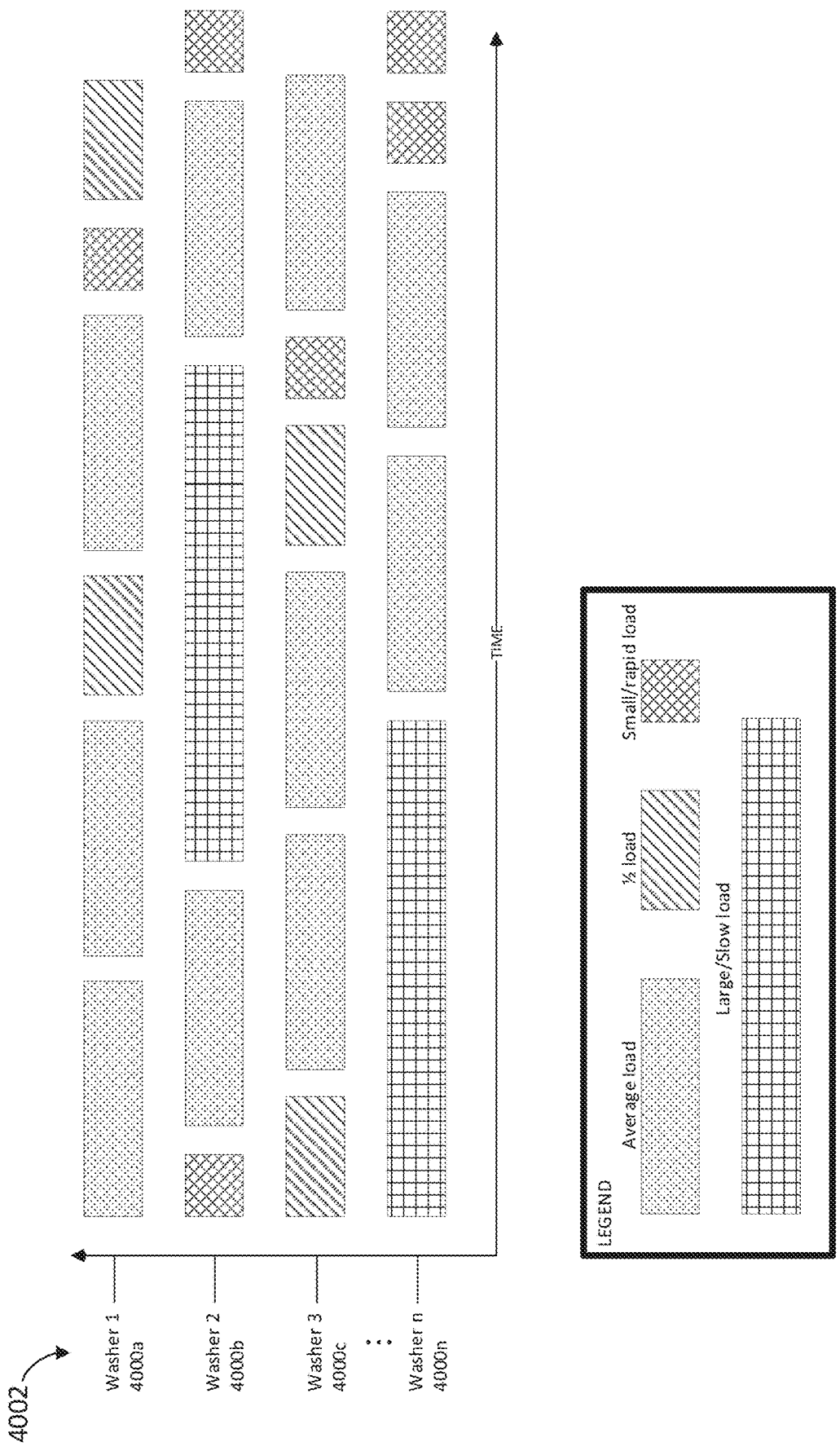
FIG. 13 depicts a schematic example of heat pump load balancing washing and drying cycles within a cluster of washing and drying robots.
Figure 14:
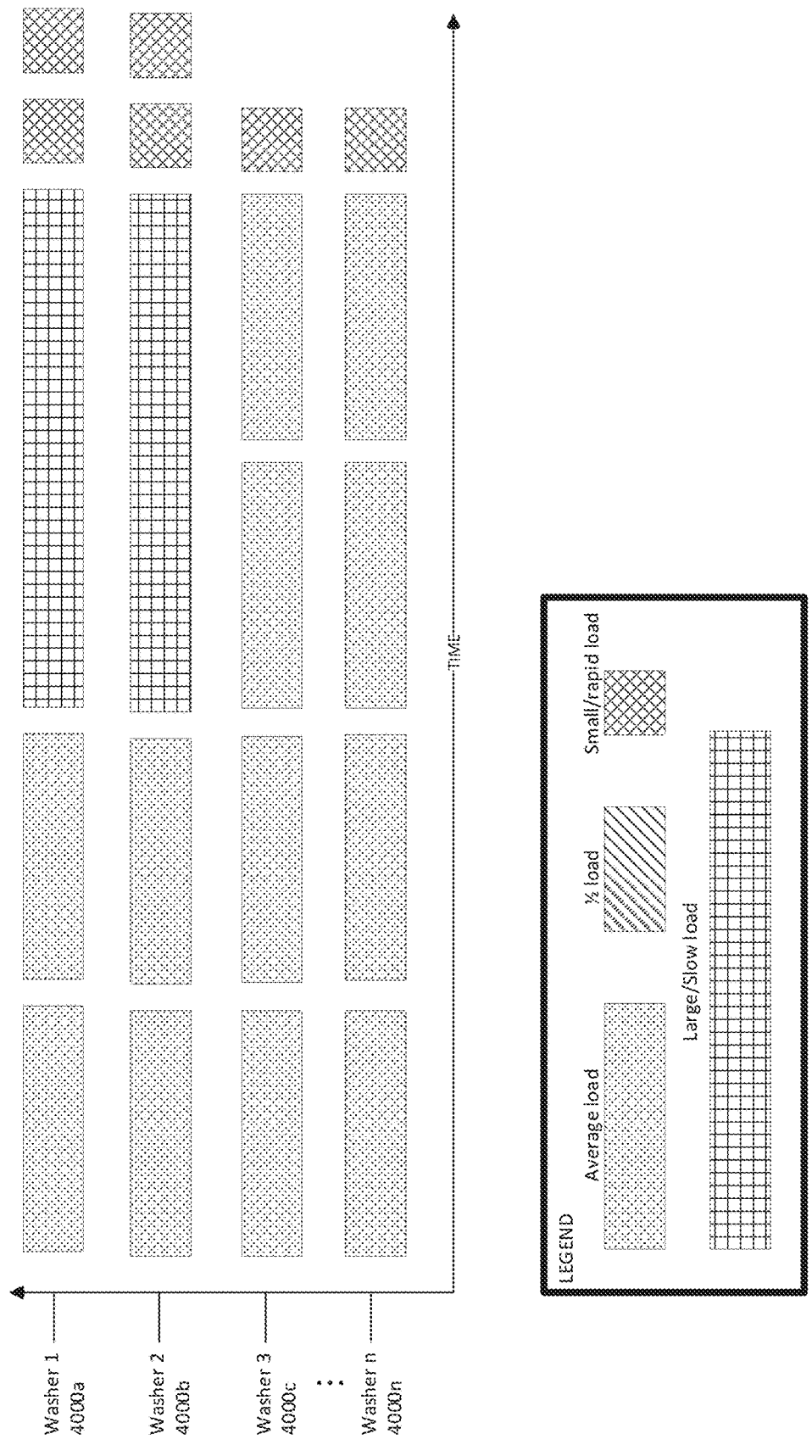
FIG. 14 depicts a schematic example of unbalanced load distribution across a cluster of washing and drying robots.

In implementations, load balancing can include balancing at least one of wash and dry temperatures, air flow rates, wash and dry cycle start times, a washing start order of batched loads of laundry distributed among at least one of the plurality of washing and drying robots 4000*a-n* in a single cluster 4002 for efficiently utilizing the heat pump 4045, avoiding transients associated with starting up and shutting down the heat pump and reusing waste heat as previously described with regard to implementations. For example, FIGS. 13 and 14 depict, respectively, a load distribution across a cluster 4002 of washing and drying robots 4000*a-n* to balance heat pump 4045 demand and an unbalanced load distribution that does not optimize heat pump 4045 demand, resulting in energy losses and inefficiencies, and potentially requiring the installation of a larger heat pump than would be required in the balanced case. In FIG. 13 the CPU 205 staggers the distribution of variously sized loads (e.g., small, medium, large) so that the cycles of each one of the plurality of washing and drying robots 4000*a-n* are staggered and the heat pump 4045 is in continuous use. The unbalanced load distribution of FIG. 14, by comparison, includes loads of the same size starting and stopping in synchrony, leading to inefficient use of the heat pump 4045, which will be called to start up and shut down repeatedly over time. In implementations, each one of the plurality of combination washing and drying machines 4000*a-n* comprises a transmittable identifier and a known physical location, and the controller is further configured to route a load of laundry to an identified available one of the plurality of combination washing and drying machines at its known physical location within a laundry facility and within the plurality the clusters 4002. Additionally or alternatively, in implementations, the balanced load distribution of FIG. 13 is achieved by the CPU 205 directing loads of laundry among a plurality of clusters 4002*a-n* depending on the various operation cycle statuses of the washing and drying robots 4000*a-n* of each cluster 4002*a-n*.

Figure 15:
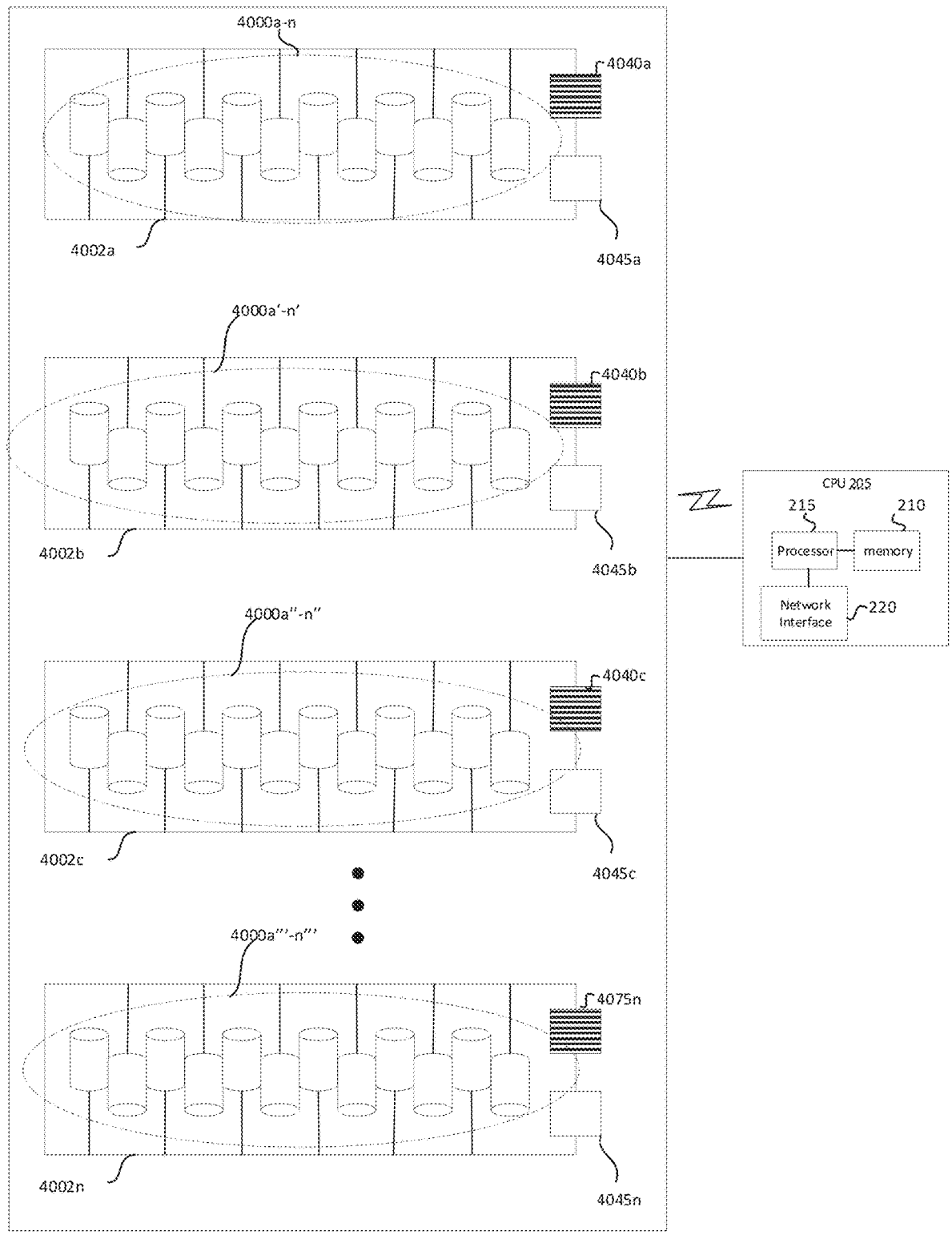
FIG. 15 depicts a schematic implementation of a system including a plurality of clusters of washing and drying robots in operative communication with a controller for load balancing washing and drying cycles within and across the plurality of clusters.

Therefore, in addition to processing planning and load balancing within a cluster 4002 of washing and drying robots 4000*a-a*, in implementations, as schematically depicted in FIG. 15, the CPU 205 is in operative communication with two or more clusters 4000*a-n* each comprising a plurality of washing and drying robots 4000*a-n*, *a'-n'*, *a"-n"*, *a'''-n'''* (referred to collectively as 4000*a-n'''*). In implementations, the CPU 205 is configured to load balance across the plurality of clusters 4002*a-n* wherein each one of the plurality of clusters 4002*a-n* comprises at least 3-12 washing and drying robots 4000*a-n* for optimizing energy efficiency gains, as previously described with regard to implementations. In implementations, each one of the plurality of combination washing and drying machines 4000*a-n'''* comprises a transmittable identifier and a known physical location, and the controller is further configured to route a load of laundry to an identified available one of the plurality of combination washing and drying machines at its known physical location within a laundry facility and within the plurality of clusters 4002*a-n*.

As previously described with regard to implementations of load balancing within a single cluster 4002, load balancing across a plurality of clusters 4002*a-n* comprises at least one of predictive load balancing across the plurality of clusters 4002*a-n* based on load characteristic and load balancing by actively adjusting process controls.

With regard to all preceding implementations comprising the CPU 205 adjusting process controls, the preprogrammed range of values adjusted by the CPU 205 for load balancing comprises a relative humidity at the intake air of the plurality of washing and drying robots 4000*a-n* of between about 5 to 15 percent. In implementations, the preprogrammed range of values can comprise an airflow to each of the plurality of washing and drying robots 4000*a-n* of between about between about 75 to 500 cubic meters per hour, with a total flow rate of 1000 to 100,000 cubic meters per hour supplied by the one or more heat pumps 4045 to the plurality of washing and drying robots 4000*a-n*. The preprogrammed range of values of relative humidity of the exhausted humid air of each of the plurality of washing and drying robots 4000*a-n* can be in a range of between about 40 to 90 percent while the combined exhaust air at the intake of the heat pump comprises an average humidity of 20-30%. In implementations, the preprogrammed range of values comprises an airflow exhausted from the plurality of washing and dryer robots 4000 of between about 1000 to 100,000 cubic meters per hour.

In implementations, as shown schematically in FIG. 5, a preprogrammed control associated with airflow comprises moving a movable damper of the manifold 4040 configured to receive and combine the exhausted humid air from two or more washing and drying machines of each cluster 4002.

In implementations, the air outlet configured to exhaust humid air during a drying cycle is disposed on a front face of each of the plurality of washing and drying robots 4000, 4000*a-n*. In implementations, the air outlet comprises an aperture comprising a grid for preventing small laundry articles from escaping. In implementations, the air outlet is disposed in the moveable door and can be disposed either on the front face of the door 4300 or along a side face of the door to prevent laundry articles from plastering the outlet and preventing airflow. In other implementations, the air outlet is disposed in another fixed part of the tub. In implementations, the humid exhaust air can pass through one or more lint removable systems 4085, 4090 including at least one of a screen, filter, and cyclonic separation system.

As previously described the exhausted humid air is cooler and more humid than the heated air at the air inlet. The preprogrammed range of values comprise a target air temperature and humidity of the exhausted humid air and takes into consideration the evaporator temperature of the heat pump 4045 and the dew point of the exhausted humid air, which will vary over the duration of a drying cycle. By mixing the exhaust from several (e.g., 3-12, 3-15, 12-24, 3-24) washing and drying robots 4000*a-n* in the manifold 4040 the system 300 achieves more uniform conditions and balances the load on the heat pump 4045.

Because lint in exhausted humid air from the one or more washing and drying robots 4000*a-n* can clog the heat exchanger 4045, implementations of the process line 100 can comprise applying intake process water to the auxiliary heat exchanger 4070 to condense out some of the humidity from the air and most of the lint. In implementations, the heated process water can be stored in an insulated container for later use. Additionally or alternatively, the controller can be configured to instruct the system to periodically rinse this auxiliary heat exchanger with process water to remove accumulated lint. The lint laden water can be output to and treated by the water treatment system 4048 to remove lint and other contaminants as low volume solid waste.

Figure 16:
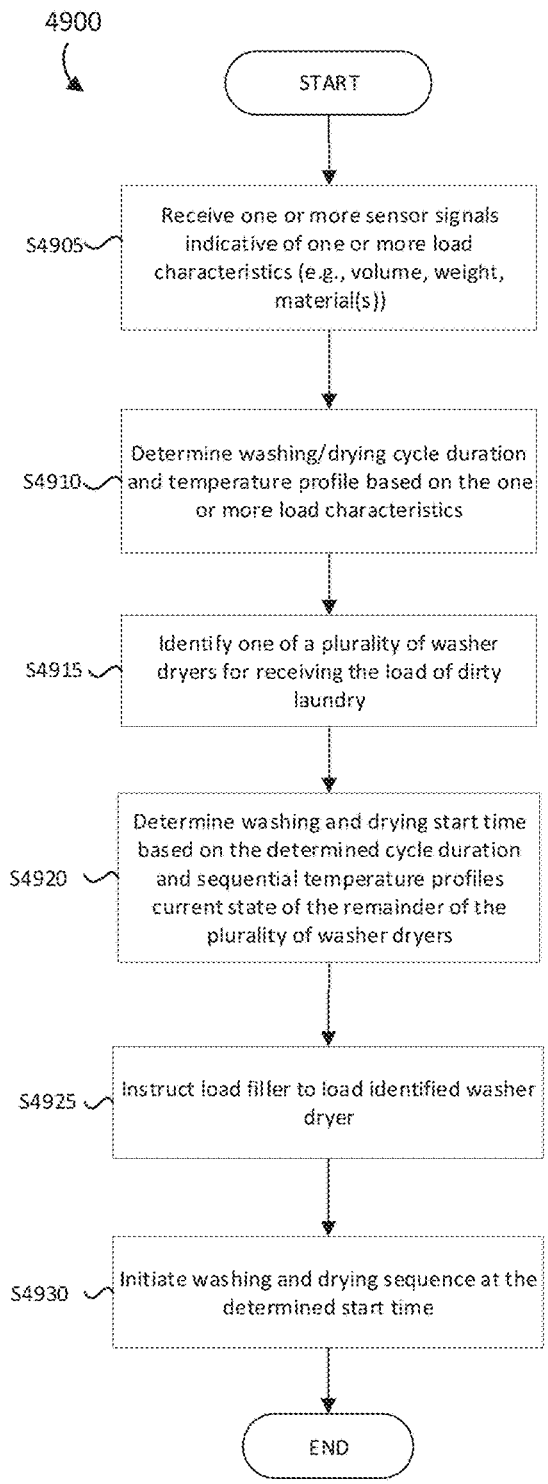
FIG. 16 depicts an implementation of a method of load balancing washing and drying start times and durations within a cluster of autonomous washing and drying devices for maximum heat pump energy efficiency.

Turning now to FIG. 16, a method 4900 of load balancing for energy efficiencies based on load characteristics is depicted. Any of the implementations described previously with regard to implementations of washing and drying robots 4000*a-n* and closed loop systems 300, 500 are applicable to implementations described herein with regard to a method 4900 of load balancing a heat pump 4045. In implementations, load balancing comprises balancing the demand on the heat pump 4045 of the system 300 to reach a steady state without losses associated with start up and shut down cycles.

In implementations, a controller, e.g., CPU 205, is configured to receive S4905 at least one of one or more sensor signals and one or more processed datum indicative of one or more load characteristics (e.g., volume, weight, material(s)). In implementations, the controller 205 is in operable communication via a wired or wireless network with one or more sensors, one or more microcontrollers (e.g., processors 4005*a-n*) of the plurality of washing and drying machines 4000*a-n*, and a network interface 3020 of a laundry separating and sorting robot configured to deliver a load of laundry to the plurality of washing and drying machines, the data being indicative of two or more load characteristics of a load of laundry and a cycle status of each one of the plurality of washing and drying machines.

In implementations, the method 4900 comprises determining S4910 washing/drying cycle duration and temperature profile based on the one or more load characteristics. In implementations, the temperature profile comprises sequential temperature and flow rate profiles of air and water throughout the washing and drying cycle.

In implementations, the method 4900 comprises identifying S4915 one of a plurality of washing and drying machines for receiving the load of laundry. In implementations, each one of the washing and drying machines comprises a single tub for sequential washing and drying of a single load of laundry and the single tub of the selected one of the plurality of washing and drying machines is detected as being empty.

In implementations, the method 4900 comprises determining S4920 a washing and drying start time based on the determined cycle duration and sequential temperature profiles, and a cycle status of each one of a remainder of the plurality of washing and drying machines such that the heat pump operates to receive exhausted humid air from the plurality of washing and drying machines, cool the exhausted humid air to provide dehumidified air, and heat the humidified air for delivery to the plurality of washing and drying machines under an approximately constant load without starting up and shutting down.

In implementations, the method 4900 comprises instructing S4925 a drive of an autonomous load filler to deliver the load of laundry to the selected one of the plurality of washing and drying machines, and initiating S4925 the washing and drying cycle at the determined start time.

In implementations, determining S4910 the washing and drying cycle duration and sequential temperature profiles of air and water throughout the washing and drying cycle comprises calculating an estimated drying time duration based on one or more load characteristics and stored relational values. The controller 205 is further configured to access the stored relational values from a memory store in wired or wireless communication with the controller, the stored relational values being associated with the two or more load characteristics of the load of laundry.

In implementations, determining S4910 the washing and drying cycle duration and sequential temperature profiles of air and water throughout the washing and drying cycle further comprises comparing the two or more load characteristics of the load of laundry to cycle duration data stored in a memory and associated with a plurality of load characteristics.

In implementations, determining S4920 the washing and drying start time for the load of laundry further comprises determining a washing order of the load of laundry among a plurality of loads of laundry queued for distribution among the plurality of washing and drying robots. determining washing order can further comprise considering cycle duration and temperature profiles of a plurality of queued loads of laundry.

In implementations, the two or more load characteristics comprise temperature and airflow cycle settings for washing and drying.

In implementations the two or more load characteristics comprise at least two of a size of the load of laundry, a fiber composition of one or more articles in the load of laundry, fabric finishes of one or more articles in the load of laundry, wash cycle temperature, article type of one or more articles in the load of laundry, and article thickness of one or more articles in the load of laundry.

In implementations, each one of the plurality of combination washing and drying machines 4000*a-n* comprises a transmittable identifier and a known physical location, and the controller 205 is further configured to route a load of laundry to selecting one of the plurality of combination washing and drying machines at its known physical location.

In implementations, operating the heat pump under an approximately constant load comprises operating in steady state without any start up and shut down related variations in heat pump power usage and energy consumption over time.

In implementations, the load of laundry comprises household laundry articles comprises at least one or a plurality of article sizes, a plurality of article water absorbency, and a plurality of article types.

As previously described with regard to implementations, one or more process lines 100, 100*a-c* can include a plurality of washing and drying robots 4000, 4000*a-n*, which intake process water, output grey water after washing loads of laundry, and output cool, humid air after drying loads of laundry with heated intake process air. In implementations, each washing and drying robot 4000, 4000*a-n* can be an electric washing and drying device with a single tub for sequential washing and drying of a single load of laundry.

All of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors or circuitry or collection of circuits, e.g. a module) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Although the subject matter contained herein has been described in detail for the purpose of illustration, it is to be understood that such detail is solely for that purpose and that the present disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

Other examples are within the scope and spirit of the description and claims. Additionally, certain functions described above can be implemented using software, hardware, firmware, hardwiring, or combinations of any of these. Features implementing functions can also be physically located at various positions, including being distributed such that portions of functions are implemented at different physical locations.

What is claimed is:

1. An energy efficient autonomous laundry system, comprising:
    a plurality of autonomous washing and drying machines configured to wash and dry a plurality of loads of laundry, each one of the plurality of autonomous washing and drying machines comprising at least one motor drive configured to rotate a spinning drum and at least one heater drive, wherein the spinning drum is configured to receive therein and sequentially wash and dry a load of laundry;
    an exhaust manifold configured to receive and combine exhausted humid air from three or more of the plurality of autonomous washing and drying machines and output the combined exhausted humid air, the manifold comprising at least one moveable valve for routing the combined exhausted humid air;
    at least one heat pump configured to receive the combined exhausted humid air from the exhaust manifold, the at least one heat pump configured to
        cool the exhausted humid air below a dew point to condense moisture from the exhausted humid air, creating dehumidified air,
        heat the dehumidified air for delivery into a conduit in fluid communication with the three or more of the plurality of autonomous washing and drying machines, and
        drain the condensed moisture;
    one or more air sensors configured to measure at least one air characteristic at one or more locations of the system, and output a signal indicative of the at least one air characteristic; and
    a controller in operative communication with the at least one motor drive and at least one heater drive of each one of the plurality of autonomous washing and drying machines, a valve actuator of the exhaust manifold, at least one drive of the heat pump and the one or more air sensors, the controller being configured to
        stagger cycles of the three or more of the plurality of autonomous washing and drying machines to balance load on the at least one heat pump,
        receive the output signal of the one or more air sensors,
        analyze the at least one air characteristic associated with the one or more air sensors,
        determine, based on the analysis, whether the at least one air characteristics is within a preprogrammed range of values for at least one of air temperature, air flow, and air humidity, and
        adjust, in response to determining at least one air characteristic is not within a preprogrammed range of values, one or more controls for at least one of air temperature, air flow, and air humidity at the one or more locations of the system,
        wherein adjusting the one or more controls comprises selectively routing a heated portion of dehumidified air from the heat pump to the three or more of the plurality of autonomous washing and drying machines.

2. The system of claim 1, wherein the plurality of autonomous washing and drying machines comprise between about 6 and 12 washing and drying machines.

3. The system of claim 1, wherein the preprogrammed range of values comprises a relative humidity of dehumidified air flowing to the plurality of autonomous washing and drying machines of between about 5 to 15 percent.

4. The system of claim 1, wherein the preprogrammed range of values comprises an airflow from or to the plurality of autonomous washing and drying machines of between about 1000 to 100,000 cubic meters per hour.

5. The system of claim 1, wherein the preprogrammed range of values comprises an air inlet configured to introduce heated air to an autonomous washing and drying machine in a range of about 50 to 90 degrees Celsius.

6. The system of claim 1, further comprising an air outlet configured to exhaust humid air during a drying cycle, wherein the preprogrammed range of values comprises a temperature of the exhausted humid air being in a range of about 30 to 50 degrees Celsius.

7. The system of claim 1, wherein the controller is further configured to selectively route the one or more loads of laundry to one or more of the plurality of autonomous washing and drying machines depending at least in part on two or more characteristics of the load of household laundry.

8. The system of claim 7, wherein the two or more characteristics of the load of household laundry comprise at least two of a size of the load of laundry, a fiber composition of one or more articles in the load of laundry, fabric finishes of one or more articles in the load of laundry, wash cycle temperature, article type of one or more articles in the load of laundry, and article thickness of one or more articles in the load of laundry.

9. The system of claim 8, wherein the controller is configured to receive at least one of the two or more characteristics from a network interface of a laundry separating and sorting robot in wired or wireless communication with the controller.

10. The system of claim 8, wherein the controller is configured to receive the two or more characteristics from a preceding robot in wired or wireless communication with the controller, and wherein the controller is further configured to estimate a drying cycle temperature range and duration based on one or more of the two or more characteristics of the load of household laundry.

11. The system of claim 8, wherein at least two of the plurality of combination washing and drying machines are in a drying cycle at any time such that the heat pump remains continuously operative.

12. The system of claim 1, wherein the range of values for at least one of air temperature, air flow, and air humidity comprise pre-set threshold values, which adjust with time over a drying duration of a washing and drying cycle.

13. The system of claim 1, wherein the at least one heater drive controls at least one of a damper, valve, and fan of each one of the plurality of autonomous washing and drying machines.

14. The system of claim 1, further comprising a plurality of clusters of washing and drying machines, each one of the plurality of clusters comprising a plurality autonomous washing and drying machines, a heat pump, an intake manifold, and an exhaust manifold.

15. The system of claim 14, wherein the controller is further configured to selectively route one or more loads of household laundry to one or more of the plurality of clusters of washing and drying machines depending on two or more characteristics of the load of household laundry and one or more stages of washing and drying cycles of the plurality of autonomous washing and drying robots of the plurality of clusters of washing and drying machines.

* * * * *